(12) United States Patent
Ammon

(10) Patent No.: US 6,678,667 B1
(45) Date of Patent: Jan. 13, 2004

(54) ADAPTIVE COMPUTER SYSTEM

(76) Inventor: Kurt Ammon, Windmühlenweg 27, W-2000 Hamburg 52 (DE)

( * ) Notice: Subject to any disclaimer, the term of this patent is extended or adjusted under 35 U.S.C. 154(b) by 0 days.

(21) Appl. No.: 08/055,093

(22) Filed: May 3, 1993

(30) Foreign Application Priority Data

May 26, 1992 (DE) .............................................. 4217314

(51) Int. Cl.$^7$ .............................................. G06F 15/18
(52) U.S. Cl. ....................................................... 706/14
(58) Field of Search ............................. 395/51, 20, 10; 706/14

(56) References Cited

U.S. PATENT DOCUMENTS

| | | | | |
|---|---|---|---|---|
| 4,881,178 A | * | 11/1989 | Holland et al. ................ | 706/12 |
| 5,072,406 A | * | 12/1991 | Ammon ......................... | 706/48 |
| 5,195,172 A | * | 3/1993 | Elad et al. ..................... | 706/62 |

FOREIGN PATENT DOCUMENTS

| | | | |
|---|---|---|---|
| EP | 0483359 | 3/1991 | ............. G06F/9/44 |
| GB | 2218834 | 5/1988 | ............ G06F/15/18 |

OTHER PUBLICATIONS

Operations Research and Artificial Intelligence Cooperation to Solve Scheduling Problems; the OPAL and OSCAR systems, C. Badie; G. Bel; E. Bensana; G Verfaillie; IEEE, Expert Planning Systems, Jun. 1990 (IEEE Conf. Pub. 322), pps. 1–5.*

A Self–guided Theorem Proving System, Sjie–Jue Lee; Department of Electrical Engineering National Sun Yat–Sen University, Taiwan, IEEE, International Conference on Computring and Information, May 1992 IEEE 0–8186–2812–X/92, pps. 329–333.*

A semantic backward chaining proof system, Xumin Nie; David A. Plaisted; Artificial Intelligence 55 (1992) pps. 109–128, Elsevier Science Publishers B.V.*

Deng, P.–S., Holsapple, C. W., Whinston, A. B., "A skill refinement learning model for rule–based expert systems", *IEEE Expert*, vol. 5, No. 2, 1990, Los Alamitos, California, USA, pp. 15–28.

Koza, J. R., "Evolving a computer program to generate numbers using the genetic programming paradigm", *Proceedings of the Fourth International Conference on Genetic Algorithms*, Jun. 13–16, 1991, Morgan Kaufmann, San Mateo, California, USA, pp. 511–518.

Lister, A. M., *Fundamentals of Operating Systems*, Macmillan Press, London, United Kingdom, 1975, pp. ii–ix, 102–109.

Pang, G. K. H., "A blackboard control architecture for real–time control", *Proceedings of the 1988 American Control Conference*, Jun. 15–17, 1988, IEEE, New York, NY, USA, 1988, pp. 221–226.

(List continued on next page.)

*Primary Examiner*—John A. Follansbee
*Assistant Examiner*—Michael B. Holmes

(57) ABSTRACT

Computer system having a memory for storing programs including knowledge, processing input signals and generating output signals which represent information. The programs contain several execution components (2,4,5) and a control component (1) which controls the execution components (2,4,5) in adjustments (3,6). A control component (1) withdraws resources from an execution component (2,4,5) which does not solve a problem and activates another execution component (2,4,5). In this way, the computer system itself selects and organizes execution components (2,4,5) in adjustments (3,6) so that problems can be solved efficiently by the execution components (2,4,5). In particular, the computer system can be applied in fields that require an automatic adaption of its programs and its knowledge to hardly predictable new problems and situations. Examples of such fields of application are image and language processing and robotics.

20 Claims, 9 Drawing Sheets

OTHER PUBLICATIONS

Ammon, K., "An automatic proof of Gödel's incompleteness theorem", *Artificial Intelligence*, vol. 61, Jun. 1993, Amsterdam: Elsevier Science Publishers B. V., pp. 291–306.

Ammon, K., "The automatic acquisition of proof methods", *Proceedings of the Seventh National Conference on Artificial Intelligence*, Aug. 21–26, 1988, St. Paul, Minnesota, Palo Alto, Calif.: Morgan Kaufmann, 1988, pp. 558–563.

Ammon, K., "Automatic proofs in mathematical logic and analysis", *11th International Conference on Automated Deduction*, Jun. 1992, Saratoga Springs, New York. Heidelberg, Germany: Springer–Verlag, 1992, pp. 5–19.

Ammon, K., "The SHUNYATA system", *11th International Conference on Automated Deduction*, Jun. 1992, Saratoga Springs, New York. Heidelberg, Germany: Springer–Verlag, 1992, pp. 691–685.

Apostal, T. M., *Mathematical Analysis*, Reading, Mass.: Addison–Wesley, 1957, pp. 43 and 75.

Bläsius, K., Eisinger, N., Siekmann, J., Smolka, G., Harold, A., and Walther C., "The Markgraf Karl Refutation Procedure", *Proceedings of the Seventh International Joint Conference on Artificial Intelligence*, Aug. 1981, Vancouver, Canada. Palo Alto, Calif.: Morgan Kaufmann, 1981, pp. 511–518.

Bledsoe, W. W., "Non–resolution theorem proving", *Artificial Intelligence*, vol. 9, No. 1, 1977, Amsterdam: North–Holland, pp. 1 and 27.

Bundy, A., *The Computer Modelling of Mathematical Reasoning*, San Diego, Calif.: Academic Press, 1983, p. 10.

Davis, M., *The Undecidable*, New York: Raven Press, 1965, p. 1.

Kleene, S. C., *Introduction to Metamathematics*. Amsterdam: North–Holland, 1952, pp. 6, 78, 99, 124, 162, 195, 205, 206, 207, 208.

McCharen, J. D., Overbeek, R. A., and Wos, L. A., "Problems and experiments for and with automated theorem–proving programs", *IEEE Transactions on Computers*, vol. C–25, No. 8, 1976, pp. 773–782.

McCune, W. W., OTTER 2.0 Users Guide, Report ANL–90/9, Argonne National Laboratory, Argonne, Illinois, 1990, pp. 1–3 and 8–15.

McCune, W. W., What's new in OTTER 2.2. Report ANL/MCS–TM–153, Argonne National Laboratory, Argonne, Illinois, 1991, pp. 1 and 2.

Ohlbach, H. J., and Siekmann, J., The Markgraf Karl Refutation Procedure, University of Kaiserslautern, Department of Computer Science, SEKI Report SR–89–19, Kaiserslautern, Germany, 1989, pp. 1 and 58.

* cited by examiner

ADAPTIVE COMPUTER SYSTEM

FIELD OF INVENTION

The invention belongs to artificial intelligence which is a subfield of computer science. It relates to a computer system which has a memory for storing programs including knowledge. By means of controlling adjustments it adapts its programs to input signals and generates output signals on the basis of the adapted programs. The input signals can be generated by keyboards or sensors and the output signals can control printers, displays, or the movements of robots.

DESCRIPTION OF PRIOR ART

The efficiency of systems of "artificial intelligence" is still very small compared to the capabilities of "human intelligence". This shall be illustrated in the field of automated theorem proving.

The objective of the field of automated theorem proving is to develop computer systems, so-called theorem provers, which automatically generate proofs of mathematical theorems. After more than thirty years of research and development the efficiency of theorem provers is still trivial compared to the capabilities of mathematicians (see Bundy, A., *The Computer Modelling of Mathematical Reasoning*, San Diego, Calif.: Academic Press, 1983, p. 10). A well-known problem in automated theorem proving is SAM's Lemma. The Markgraf Karl Refutation Procedure is one of the greatest projects in the history of automated theorem proving (see Blåsius, K., Eisinger, N., Siekmann, J., Smolka, G., Herold, A., and Walther, C., The Markgraf Karl Refutation Procedure, *Proceedings of the Seventh International Joint Conference on Artificial Intelligence*, August 1981, Vancouver, Canada). After some fifteen years of development Ohlbach and Siekmann give SAM's Lemma as the only more difficult theorem the Markgraf Karl Refutation Procedure has proved. But a proof of SAM's Lemma is rather trivial from a mathematician's point of view because the proof consists of eight equations seven of which simplify the right side of the first equation (see Ammon, K., *Proceedings of the Seventh National Conference on Artificial Intelligence*, Aug. 21–26, 1988, St. Paul, USA).

The most known procedure in the field of automated theorem proving is the resolution procedure. The theorem prover OTTER 2.2, which is often regarded as the most powerful resolution prover, is also capable of proving SAM's Lemma (McCune, W. W., OTTER 2.0 Users Guide, Report ANL-90/9, Argonne National Laboratory, Argonne, Ill., 1990, and McCune, W. W., What's new in OTTER 2.2. Report ANL/MCS-TM-153, Argonne National Laboratory, Argonne, Ill., 1991). But in the proof of SAM's Lemma the Markgraf Karl Refutation Procedure and OTTER 2.2 do not satisfy the important minimal requirement that a theorem prover should be capable of processing all axioms. For example, the set of axioms in McCharen, J. D., Overbeek, R. A., and Wos, L. A., Problems and experiments for and with automated theorem-proving programs, *IEEE Transactions on Computers*, Vol. C-25, No. 8, pp. 773–782, is not complete because it does not contain the ordinary lattice operations "join" and "meet", that is, the existence of a minimum and a maximum in McCharen et al.'s representation. If these most elementary axioms are given to the system, the theorem prover OTTER 2.2 breaks down in a combinatorial explosion. This means that OTTER 2.2 is not capable of proving SAM's Lemma because the proof is largely given to the system by a manual selection of the axioms. For the Markgraf Karl Refutation Procedure a proof of SAM's Lemma is even more difficult than for OTTER 2.2.

Conventional theorem provers such as the Karl Refutation Procedure and OTTER 2.2 have to be controlled manually by so-called options (McCune, W. W., OTTER 2.0 Users Guide, Report ANL-90/9, Argonne National Laboratory, Argonne, Ill., 1990). Because these theorem provers are extensive programs which contain many complex procedures and require powerful computers, a manual control of these options is extremely difficult. This difficulty is even increased by the fact that the procedures in these theorem provers are very different from human reasoning processes, that is, the reasoning processes of the users of these theorem provers. Furthermore, theorem proving problems must be manually translated into a form that can be processed by these theorem provers. For example, the proof of SAM's Lemma requires a translation of the lattice operations into minimum and maximum relations. Such a manual translation of a theorem can be more difficult than a manual proof of the theorem. Furthermore, it is not known in advance into which representation a theorem must be translated so that a theorem prover can find a proof. Furthermore, conventional theorem provers produce unreadable proofs which must be manually retranslated into a readable form.

Conventional theorem provers are not capable of generating the central ideas of significant theorems in higher mathematics, for example a proof of Gödel's Incompleteness Theorem. Even if these ideas are given to a conventional theorem prover, it breaks down after few simple steps in an combinatorial explosion because it cannot process all definitions and lemmas required for proving significant theorems (vgl. Bledsoe, W. W., Non-resolution theorem proving, *Artificial Intelligence*, Vol. 9, 1977, p. 27). Newer approaches to the development of theorem provers, for example the technology of expert systems, have hardly been applied or did not yield better results. Thus, the capabilities of conventional theorem provers are limited to trivial marginal subfields of mathematics.

An essential property of conventional theorem provers is that they contain many complex and extensive procedures which cannot adapt themselves to hardly predictable new problems and situations. Thus, these theorem provers produce many useless steps and finally break down in a combinatorial explosion because they cannot find new ways if a chosen way does not solve a problem.

The problems and limits of the capabilities described above are not restricted to the field of automated theorem proving. Rather, they apply to systems in other fields of artificial intelligence such as image and language processing and robotics.

DISCLOSURE OF INVENTION

The object of the invention is to provide a user-friendly, economical and efficient computer system having a memory for storing knowledge and programs which can also be used in fields that require the solution of new and hardly predictable problems.

According to the invention, this object is achieved by the computer system described subsequently. It processes input signals and finally generates output signals with the aid of the programs and the knowledge in its memory wherein the input and the output signals represent information. It is called adaptive because it is capable of adapting its programs and its knowledge to hardly predictable new problems. An adaptive computer system contains control components and execution components. The control components control the execution components in so-called adjustments. In this process resources are withdrawn from execution components that cannot solve a problem. The withdrawal of resources can be carried out in different ways, for example, completely, partially or temporarily. The withdrawal of resources can also be achieved in that an execution components terminates of itself without result. An important advantage of adaptive computer systems is that they can, by means of adjustments, select execution components that are suitable for solving a problem. Thus, the application of execution components that are not useful for solving a problem is largely avoided. This entails that adaptive computer systems can select and organize a tailored set of efficient execution components which are suitable for solving a problem.

An adaptive computer system is capable of adapting itself to unpredictable new situations, that is, situations that cannot in advance be described completely and in all details. It is capable of generating variations of execution components and then activating these components. It is particularly efficient if in adjustments, it first activates execution components that are simple or require few resources. This efficiency is particularly great if execution components satisfying these two properties, that is, which are simple and require few resources, are activated first. This way of activating execution components has the advantage that an adaptive computer system can be efficient as well as general. The efficiency is achieved by first activating execution components that require few resources. The generality is achieved by then activating more general execution components. Another advantage of this way of activating execution components is that control and execution components can have a simple structure and thus the computer system can be used easily. An adaptive computer system is capable of generating methods for solving problems by composing elementary concepts. It can contain control components that reduce the goal to solve a problem to the subgoal to solve one or more other problems. In adjustments, a control component of an adaptive computer system can control several control components which, in adjustments, control further control components or execution components. This yields the advantage that control and execution components can have a simple structure and thus the computer system can be used easily. An adaptive computer system can select the knowledge required for solving a problem from a knowledge base. This yields the advantage that such a system can also efficiently process great sets of knowledge and does not apply knowledge that is not useful for solving a problem. In an adjustment, an adaptive computer system can allocate more resources to an execution component that produces intermediate results. In this way, its efficiency increases because execution components that are less useful for solving a problem consume less resources. An adaptive computer system can contain a control component which, in several adjustments having a cyclic structure, is activated by a control component it itself has activated.

BEST MODE FOR CARRYING OUT THE INVENTION

A detailed description of the best mode for carrying out the invention is given below. It should be understood, however, that it is not intended to limit the invention to the particular form disclosed, but on the contrary, the intention is to cover all modifications and variations falling within the spirit and scope of the invention as defined by the appended claims.

Figure 1:
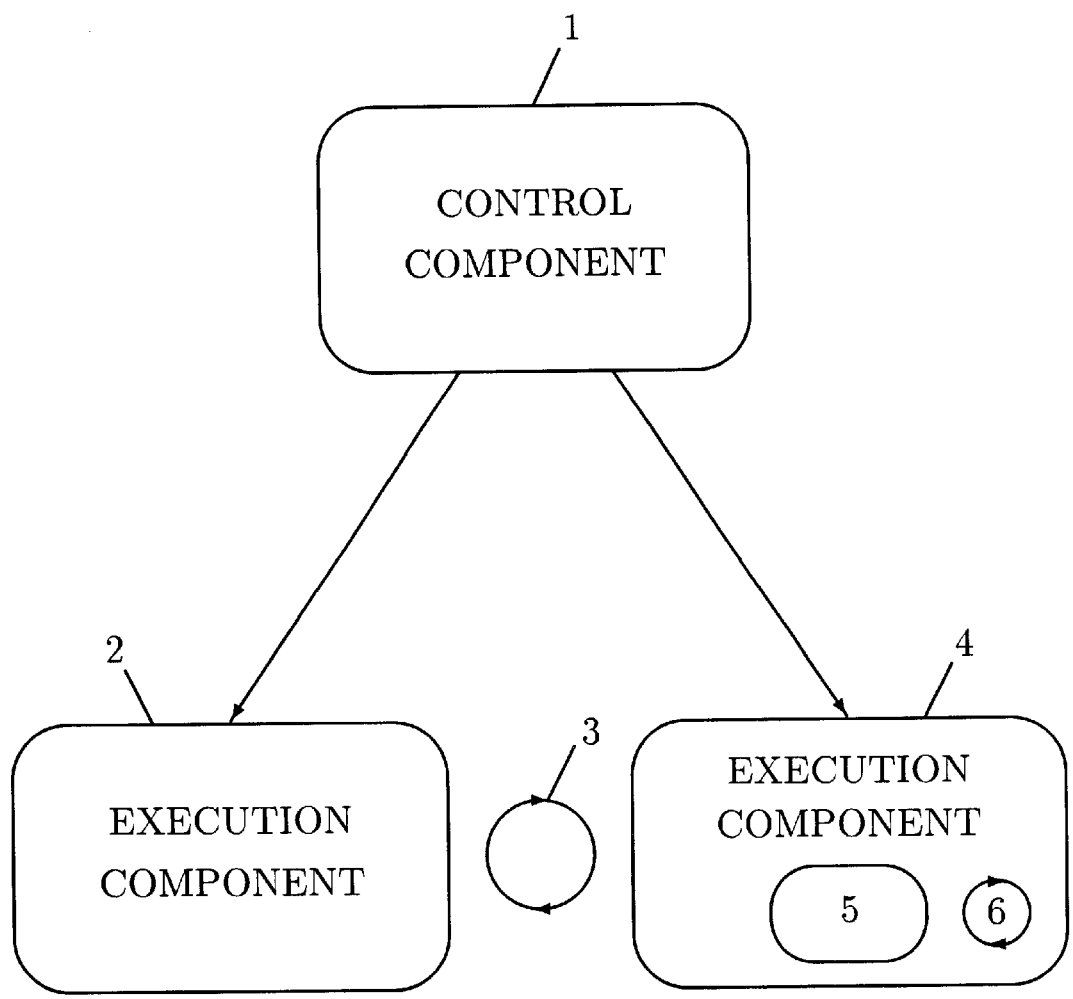
FIG. 1 shows the interaction of a control component and several execution components of an adaptive computer system in adjustments.

An adaptive computer system contains control components and executions components. The control components control the execution components in adjustments. FIG. 1 shows the interaction of a control component 1 and several execution components 2, 4, and 5 in an adaptive computer system in adjustments 3 and 6. The control component 1 activates an execution component 2 to achieve a goal. If the execution component 2 does not yield a result, it activates in an adjustment 3 another execution component 5. If the execution component 5 does not yield a result either, in an adjustment 6 another execution component 4 is activated. The execution component 4 can be a variation of the execution component 5 which is more general than the execution component 5. If the execution component 4 does not yield a result either, in an adjustment another execution component is called, for example, in an adjustment 3 a variation of the execution component 2.

Figure 2:
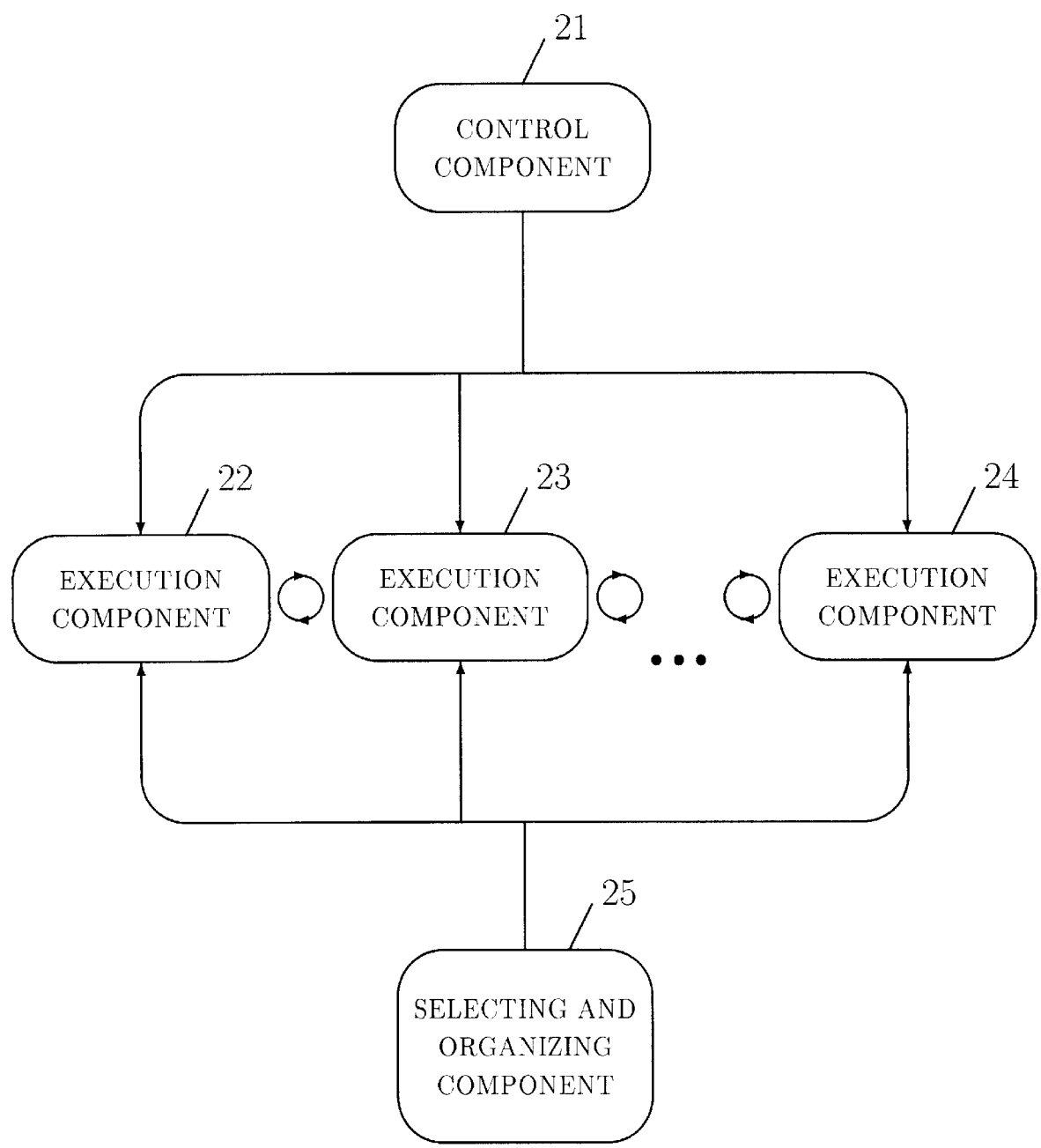
FIG. 2 shows a plurality of execution components, a control component for controlling the execution components and a component for selecting and organizing the execution components.

FIG. 2 shows a plurality of execution components 22, 23, and 24, a control component 21 for controlling the execution components 22, 23, and 24, and a component 25 for selecting and organizing the execution components 22, 23, and 24. FIG. 2 corresponds to FIG. 1 and claims 1 and 11.

Figure 3:
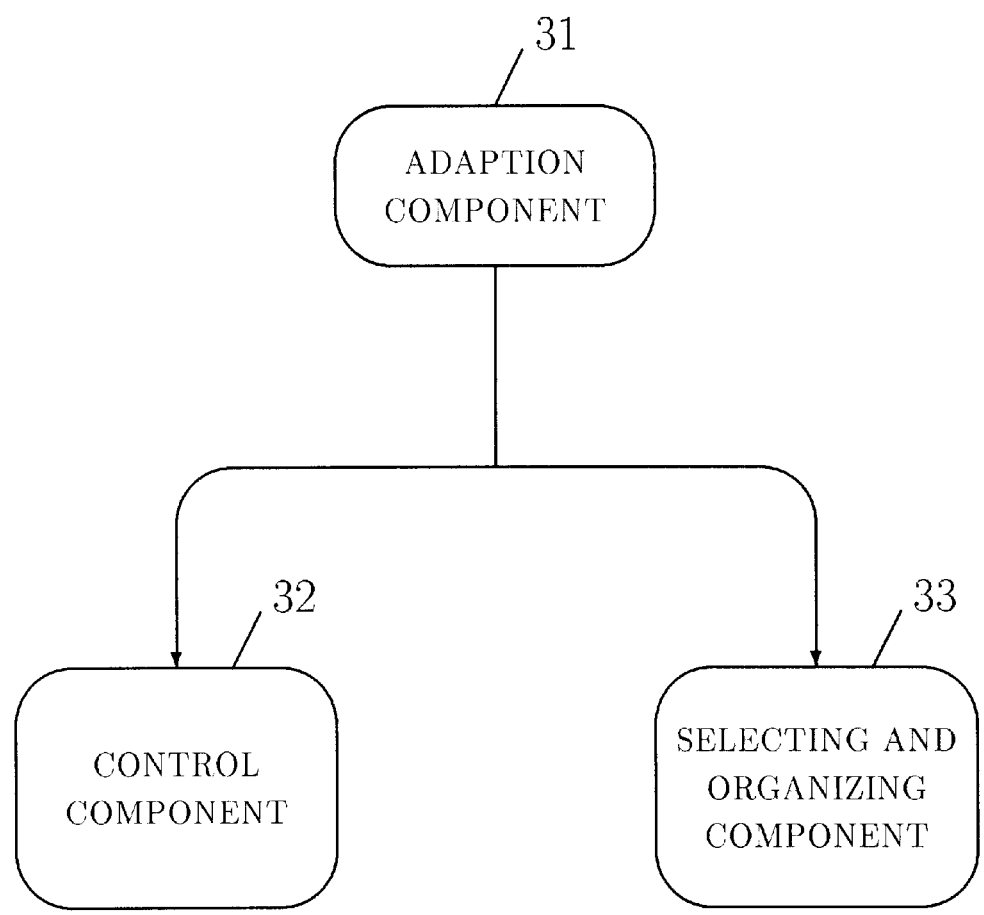
FIG. 3 shows a component for adapting a control component and a component for selecting and organizing the execution components.

FIG. 3 shows a component 31 for adapting a control component 32 and a component 33 for selecting and organizing the execution components. FIG. 3 corresponds to claims 2 and 12.

Figure 4:
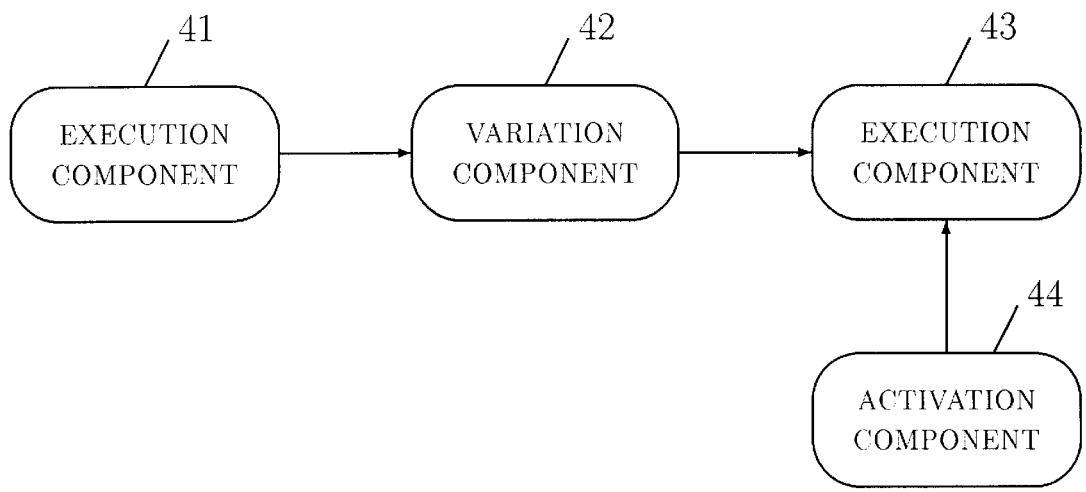
FIG. 4 shows a component for generating a variation of a execution component and a component for activating the variation.

FIG. 4 shows a component 42 for generating a variation 43 of a execution component 41 and a component 44 for activating the variation 43. FIG. 4 corresponds to claims 3 and 13.

Figure 5:
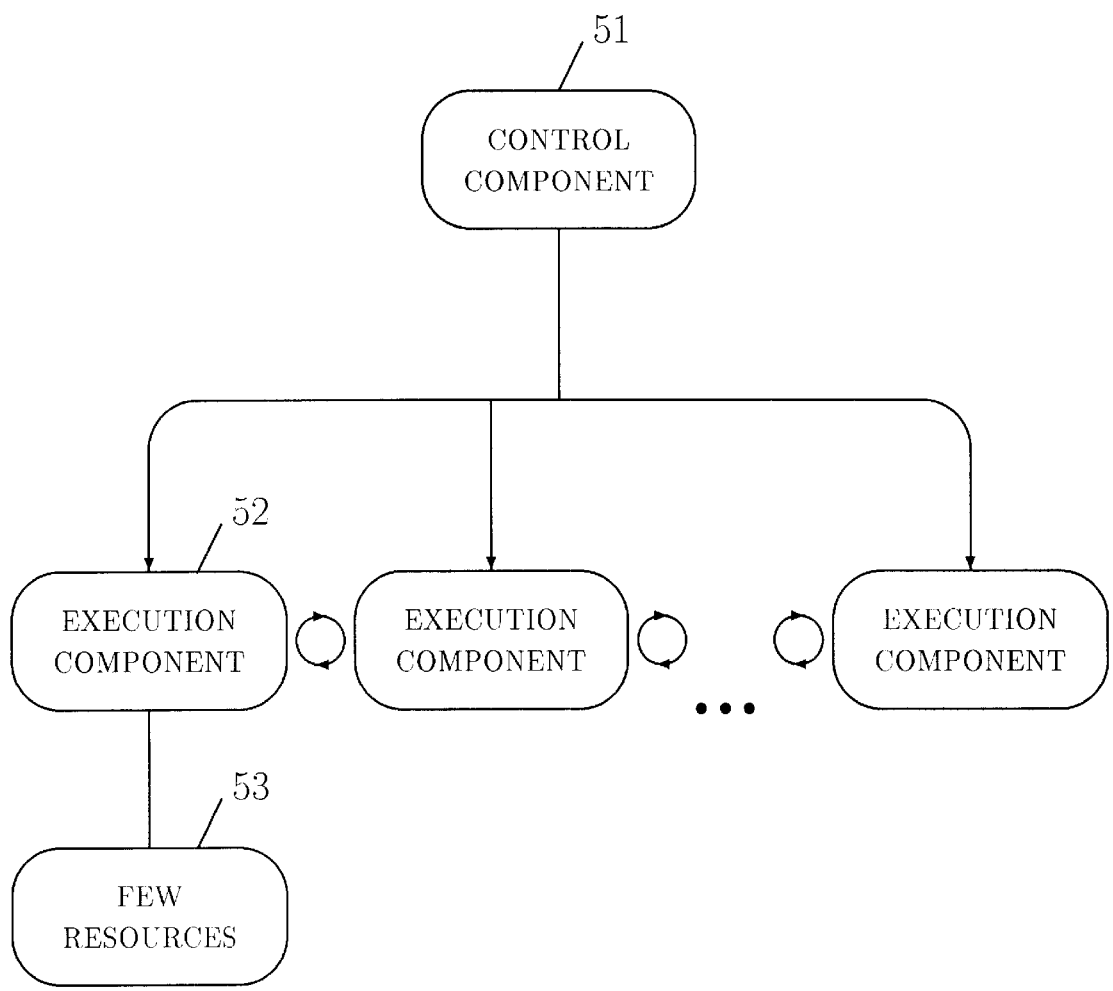
FIG. 5 shows a control component which first activates a execution component requiring few resources.

FIG. 5 shows a control component 51 which first activates a execution component 52 requiring few resources 53. FIG. 5 corresponds to claims 4 and 14.

Figure 6:
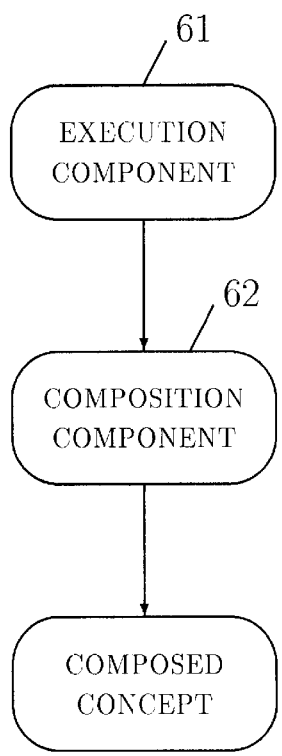
FIG. 6 shows an execution component comprising a component for generating methods for solving problems by composing elementary concepts.

FIG. 6 shows an execution component 61 comprising a component 62 for generating methods for solving problems by composing elementary concepts. FIG. 6 corresponds to claims 5 and 15.

Figure 7:
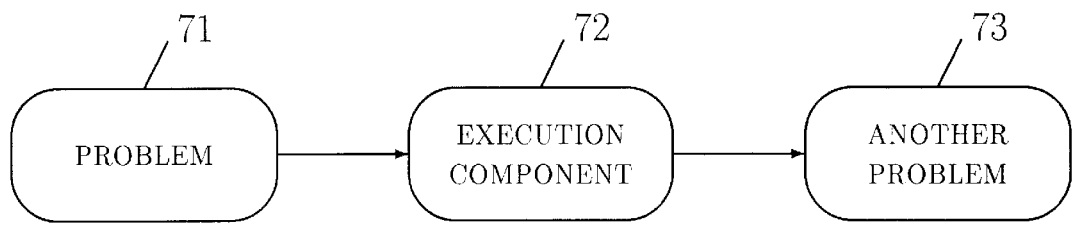
FIG. 7 shows a control component which reduces a problem to another problem.

FIG. 7 shows a control component 72 which reduces a problem 71 to another problem 73. FIG. 7 corresponds to claims 6 and 16.

Figure 8:
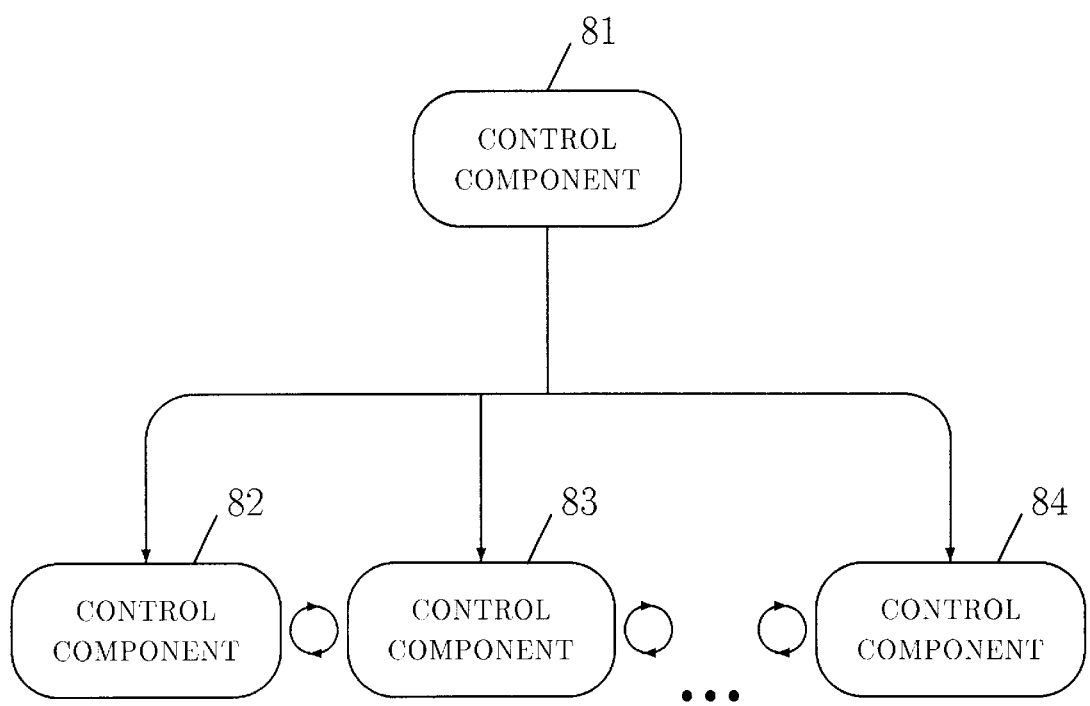
FIG. 8 shows a control component which controls further control components.

FIG. 8 shows a control component 81 which controls further control components 82, 83, and 84. FIG. 8 corresponds to claims 7 and 17.

Figure 9:
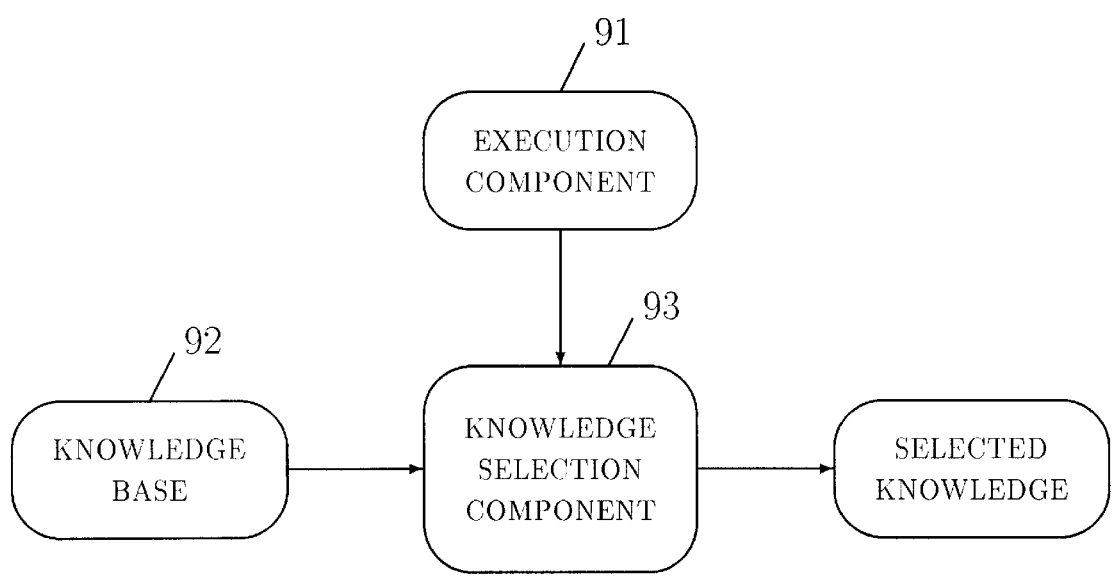
FIG. 9 shows an execution component which comprises a component for selecting knowledge required for solving problems from a knowledge base.

FIG. 9 shows an execution component 91 which comprises a component 93 for selecting knowledge required for solving problems from a knowledge base 92. FIG. 9 corresponds to claims 8 and 18.

Figure 10:
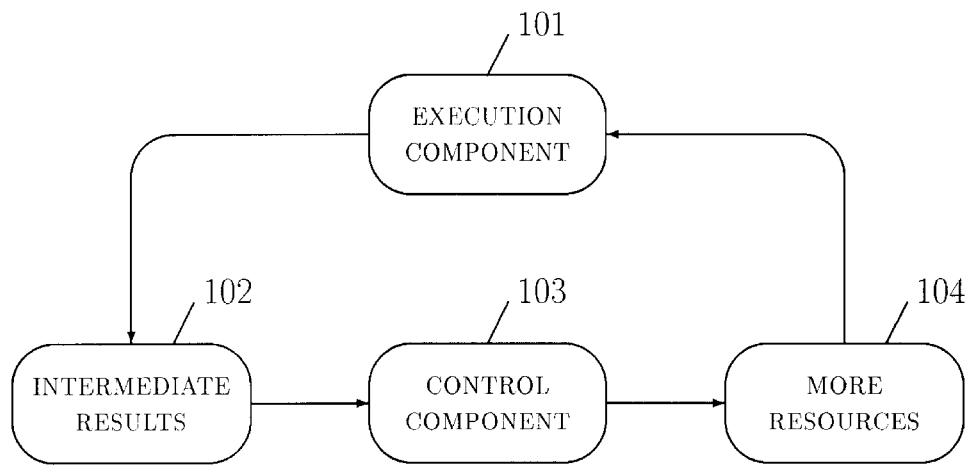
FIG. 10 shows a control component which assigns more resources a execution component producing intermediate results.

FIG. 10 shows a control component 103 which assigns more resources 104 a execution component 101 producing intermediate results 102. FIG. 10 corresponds to claims 9 and 19.

Figure 11:
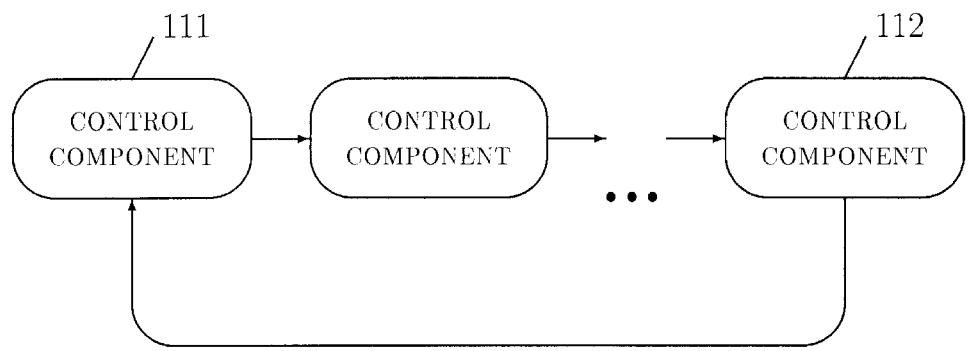
FIG. 11 shows a control component which is activated by another control component whose activation the first control component has caused.

FIG. 11 shows a control component 111 which is activated by another control component 112 whose activation the first control component 111 has caused. FIG. 11 corresponds to claims 10 and 20.

An adaptive computer system whose control and execution components are rather simple procedures for proving mathematical theorems is described subsequently. The field of mathematics was chosen because it makes a compact illustration of a simple and efficient adaptive computer system possible. First, procedures for proving mathematical theorems are described. Then, their mode of operation is illustrated by three examples which show that adaptive computer systems are capable of discovering readable proofs of very significant theorems in higher mathematics. The first example describes a mechanical proof of a simple theorem in mathematical logic. In the proof of this theorem, a famous mathematical procedure, Cantor's diagonal method, is rediscovered. The second example describes a mechanical proof of Gödel's Incompleteness Theorem which is regarded as an epochal discovery and the crowning achievement of mathematical logic. Because in this second example Cantor's diagonal method is also rediscovered, this example shows that adaptive computer systems are capable of producing epochal discoveries and outstanding achievements of different generations of mathematicians in a single step. The third example describes a mechanical proof of an important theorem in higher analysis. The theorem says that a continuous function on a compact set of real numbers is uniformly continuous. The proof of this theorem is more difficult than the proofs in the two preceding examples.

In the three examples the concepts of "instance" and "matching" of the field of artificial intelligence are often used. Now, they are illustrated briefly. Let $f(x_1, x_2, \ldots x_n)$ be an expression with the free variables $x_1, x_2, \ldots x_n$. The application of a substitution $\alpha_1/x_1, \alpha_2/x_2, \ldots, \alpha_n/x_n$ for the variables $x_1, x_2, \ldots x_n$ to the expression $f(x_1, x_2, \ldots x_n)$ yields an instance $f(\alpha_1, \alpha_2, \ldots \alpha_n)$ of this expression. Conversely, the matching of the expression $f(x_1, x_2, \ldots x_n)$ with the expression $f(\alpha_1, \alpha_2, \ldots \alpha_n)$ yields an substitution $\alpha_1/x_1, \alpha_2/x_2, \ldots, \alpha_n/x_n$ for the variables $x_1, x_2, \ldots x_n$.

The control and execution components of the adaptive computer system described subsequently are procedures for proving mathematical theorems. The input of a procedure is a goal, which may contain a constraint such as a time limit, and a partial proof, which is a list of proof steps. A proof step contains a proposition or an assumption, and an explanation which gives the procedures, definitions, lemmas, and preceding proof steps that were used to derive the proposition or generate the assumption. The procedures produce further proof steps and subgoals. Besides the goal to prove a proposition, some procedures pursue the goal $$\text{prove } x : P(x_1, x_2, \ldots, x_n) \tag{1}$$

to prove a proposition $P(x_1, x_2, \ldots, x_n)$ with free variables $x_1, x_2, \ldots, x_n$, that is, they construct $x_1, x_2, \ldots, x_n$ such that $P(x_1, x_2, \ldots, x_n)$ holds.

The proof procedure first calls the search procedure which tests whether a proposition to be proved has already been proved. Otherwise, it finds out the type of the proposition, that is, it tests whether the proposition is an element relation, a universal or existential proposition, a conjunction, an implication, a negation, or an inequality and calls a special procedure which proves propositions of this type. If the special procedure fails, the proof procedure calls the reduction procedure and the replacement procedure. The proof procedure also proves propositions $P(x_1, x_2, \ldots, x_n)$ with free variables $x_1, x_2, \ldots, x_n$, that is, it constructs $x_1, x_2, \ldots, x_n$ such that $P(x_1, x_2, \ldots, x_n)$ holds.

The search procedure tests whether a proposition to be proved is contained in a preceding proof step or is equal to a lemma or a theorem. The procedure also tests whether a given proposition $P(x_1, x_2, \ldots, x_n)$ with the free variables $x_1, x_2, \ldots, x_n$ can be matched with a proposition in a preceding proof step, a lemma or a theorem.

The element procedure proves element relations $x \in S$. It searches for a subset relation $T \subseteq S$ in a preceding proof step. By means of this subset relation, it reduces the goal to prove an element relation $x \in S$ to the subgoal to prove the element relation $x \in T$. The application of the subset relation $T \subseteq S$ to $x \in T$ then yields the element relation $x \in S$ to be proved. Furthermore, it searches for a function $f$ on a set T into a set S. By means of the function $f$, it reduces the goal to prove an element relation $x \in S$ to the subgoal to prove the element relation $x \in T$. The application of the function $f$ to $x \in T$ then yields the element relation $x \in S$ to be proved. The element procedure also processes the goal to prove propositions of the form $x \in S$, where x is a free variable. By means of a subset relation $T \subseteq S$ or a function $f$ on a set T into a set S, it reduces this goal to the subgoal to prove a proposition of the form $x \in T$ with the free variable x.

The universal procedure proves universal propositions whose scope contains an implication, that is, universal propositions of the form $\forall x_1, x_2, \ldots, x_n (P(x_1, x_2, \ldots, x_n) \rightarrow Q(x_1, x_2, \ldots, x_n))$. It introduces the assumption that $P(x_1, x_2, \ldots, x_n)$ holds and calls the proof procedure to prove $Q(x_1, x_2, \ldots, x_n)$. This implies the universal proposition to be proved.

The existential procedure proves existential propositions $\exists x(x \in S \land P(x))$. First, it searches for elements $\alpha \in S$ in the proof and calls the proof procedure to prove $P(\alpha)$ within a time limit. The application of the rule of inference of existence introduction to the conjunction $\alpha \in S \land P(\alpha)$ then yields the existential proposition to be proved.

If an element $\alpha \in S$ cannot be found or $P(\alpha)$ cannot be proved, the existential procedure calls the concept procedure which transforms concepts in preceding proof steps into a form that can be processed by the other procedures. Then, it introduces the assumption $x \in S$ and calls the proof procedure to prove $P(x)$. If another procedure produces the subgoal to prove an equality or inequality $R(x)$ containing the variable x, this equality or inequality $R(x)$ is regarded as a property of x and the assumption is introduced that $R(x)$ holds. If a proof of $P(x)$ is achieved, the existential procedure constructs an $x \in S$ from the property $R(x)$ by means of simple rules. An example of such a rule is: If $R(x)$ says that x is less than any element of a finite set S of numbers, then define x as the minimum of S. Then, the procedure proves the equality or inequality R(x) on the basis of the definition of x∈S. Finally, it applies the rule of existence introduction to the conjunction x∈S∧P(x). This yields the existential proposition to be proved.

The existential procedure also proves existential propositions which say that there is a formula or a predicate x satisfying a given property P(x). To this end, the existential procedure calls the composition procedure which constructs examples of such formulas or predicates. Then, it calls the proof procedure for each formula or predicate x to prove the property P(x) within a time limit. The time limit is doubled if the proof of P(x) fails for all formulas or predicates. If a proof is achieved, according to the rule of existence introduction it follows that there is a formula or a predicate x satisfying the property P(x) which was to be proved. If the composition procedure produces short and long formulas or predicates x, the existential procedure first attempts to prove the property P(x) for short formulas or predicates.

The concept procedure searches for names of mathematical concepts that occur in preceding proof steps and applies the definitions of these concepts to the partial proof. Then, it calls the Skolem procedure and the set procedure which transform the universal propositions in the partial proof into a form which they can be processed by the other procedures.

The Skolem procedure transforms universal propositions whose consequents contain existential propositions by replacing the existential quantifiers in the consequents by functions, that is, it skolemizes the existential quantifiers.

The set procedure constructs subsets of a set and collections of subsets of a set. If the antecedent of a universal proposition contains a subset of a set or a collection of subsets of a set, the set procedure constructs examples of such subsets or collections of subsets and applies the universal proposition to the subset or collection of subsets. The new proposition thus generated are then transformed into a more explicit form. In order to construct a subset of a set S, the set procedure searches for a predicate P(x) with a free variable x in a preceding proof step and applies P(x) to define a set $\{x : x \in S \land P(x)\}$ which exactly contains the elements x∈S for which P(x) holds. In order to define a collection of subsets of a set S, it searches for a predicate P(α, x) with two free variables α and x in a preceding proof step and applies a variable such as α as an index of a collection of sets $\{x : x \in S \land P(\alpha, x)\}$. If a predicate P(α, x, y) contains an additional free variable y, this variable y is replaced by a new function $f(\alpha)$. This yields a collection of sets $\{x : P(\alpha, x, f(\alpha))\}$. The function $f$ is defined subsequently, for example, by the existential procedure.

If the set procedure cannot find a suitable predicate P(x) for the construction of a subset of a set S, it calls the composition procedure which constructs a predicate P(x) from elementary functions. Then, a set $\{x : x \in S \land P(x)\}$ is defined by means of the predicate P(x).

The composition procedure constructs formulas and predicates by applying rules for the formation of formulas and predicates to the partial proof. Roughly speaking, the rules give the domains and ranges of elementary functions which form the elementary building stones of the new formulas and predicates. The application of the rules yields compositions of the elementary functions. Some of these compositions are formulas or predicates. The composition procedure terminates the construction of formulas and propositions if a certain number of formulas and propositions is generated or a time limit is exceeded. Examples of rules for the formation of formulas and predicates are:

Rule 1 If T is a subset of a set S and x is an element of S, then x∈T is a proposition. A formalization of this rule is: ∀T, S, x(T⊆S∧x∈S→proposition(x∈T))

Rule 2 If A is a proposition, then the negation ¬A of A is also a proposition. A formalization of this rule is: ∀A(proposition(A)→proposition (¬A))

The application of the first rule to the propositions T⊆S and x∈S in a partial proof yields that x∈T is a proposition. The application of the second rule to the proposition x∈T yields that ¬x∈T is a proposition.

Analogously to the construction of propositions, the composition procedure constructs predicates to define subsets of sets. In order to define a subset of a set S, it introduces a variable x∈S and applies universal propositions in preceding proof steps and rules for the formation of formulas to the partial proof. This process produces propositions P(x) containing the variable x∈S, that is, predicates P(x). These predicates can be used to define subsets $\{x : x \in S \land P(x)\}$ of S exactly containing the elements of S for which P(x) holds. For example, the application of Rules 1 and 2 to the subset relation T⊆S in a preceding proof step and the variable x∈S yields the predicates x∈T and ¬x∈T. The predicate ¬x∈T defines the subset $\{x : x \in S \land \neg x \in T\}$ of S, that is, the complement of T in S.

The paraphrase procedure transforms propositions into a more explicit form. It searches for terms s in a proposition P(s) to be proved and calls the equality procedure to prove an equation of the form s=t, where t is the term to be constructed. Then, it replaces the term s in the proposition P(s) by t. This yields a proposition P(t) containing the term t.

The paraphrase procedure also searches for indexed terms $s_i$, where i is an element of an indexed set I, in a proposition $P(s_i)$ and calls the equation procedure to prove an equation of the form $$\forall i(i \in I \rightarrow s_i = t_i), \qquad (2)$$

where $t_i$ is an indexed family of sets to be constructed. Then, it replaces the family $s_i$ in the proposition $P(s_i)$ by $t_i$. This yields a proposition $P(t_i)$ which contains the family $t_i$.

The equation procedure proves equations s=t whose left side s is a given term and whose right side t is a term to be constructed. It, searches for a universal proposition in a preceding proof step, in a definition, or in a lemma whose consequent contains an equation and matches one side of this equation with the given left side s of the equation s=t to be proved. The matching yields a substitution which is applied to the antecedent of the universal proposition. Then the proof procedure is called to prove the resulting instance of the antecedent. The application of the universal proposition to this instance finally yields the equation to be proved.

The equation procedure also proves universal propositions $$\forall i(i \in I \rightarrow s_i = t_i) \qquad (3)$$

whose conclusion $s_i = t_i$ contains an indexed family of terms $s_i$ and $t_i$, where i is an element of an index set I. The family $s_i$ of terms in the left sides of the equations $s_i = t_i$ is given and the family $t_i$ is to be constructed. The procedure searches for a universal proposition in a preceding proof step, in a definition, or in a lemma whose consequent contains an equation and matches one side of this equation with the given left side $s_i$ of the equation $s_i = t_i$ in the universal proposition (3) to be proved. The matching yields a substitution which is applied to the antecedent of the universal proposition. Then, the proof procedure is called to prove the resulting instance of the antecedent. The application of the universal proposition to this instance finally yields the universal proposition (3) to be proved.

The conjunction procedure proves conjunctions A∧B by calling the proof procedure to prove A and B. This finally yields the conjunction A∧B to be proved.

The implication procedure proves implications A→B. It introduces the assumption that A holds and calls the proof procedure to prove B. This finally yields the implication to be proved.

The negation procedure proves negations. First, it calls the reduction procedure within a time limit. If the reduction procedure fails, the contradiction procedure is called.

The reduction procedure searches for a universal proposition in a preceding proof step, in a definition, or in a lemma whose consequent can be matched with a proposition to be proved. The matching yields a substitution which is applied to the antecedent of the universal proposition. Then, the proof procedure is called to prove the resulting instance of the antecedent. The application of the universal proposition to this instance finally yields the proposition to be proved. For example, the consequent $Q(x_1, x_2, \ldots x_n)$ in the universal proposition $$\forall x_1, x_2, \ldots x_n (P(x_1, x_2, \ldots x_n) \to Q(x_1, x_2, \ldots x_n)) \quad (4)$$

can be matched with a proposition $Q(\alpha_1, \alpha_2, \ldots \alpha_n)$ to be proved. The application of the universal proposition to the instance $P(\alpha_1, \alpha_2, \ldots \alpha_n)$ of the antecedent then yields the proposition $Q(\alpha_1, \alpha_2, \ldots \alpha_n)$ to be proved.

The scope of the universal proposition (4) contains a single implication. The reduction procedure transforms universal propositions that have not the form (4) into universal propositions of this form. For example, universal propositions of the form $$\forall x (P(x) \to (Q(x) \Leftrightarrow R(x))) \quad (5)$$

are transformed into universal propositions $\forall x(P(x) \land Q(x) \to R(x))$ and $\forall x(P(x) \land R(x) \to Q(x))$ and then processed like the universal proposition (4), that is, by means of the universal proposition (4) the goal to prove a proposition $R(\alpha)$ is reduced to the subgoal to prove the conjunction $P(\alpha) \land Q(\alpha)$, and thee goal to prove a proposition $Q(\alpha)$ is reduced to the subgoal to prove the conjunction $P(\alpha) \land R(\alpha)$.

The reduction procedure also proves propositions $Q(x_1, x_2, \ldots x_n)$ with free variables $x_1, x_2, \ldots x_n$, that is, it constructs $x_1, x_2, \ldots x_n$ such that $Q(x_1, x_2, \ldots x_n)$ holds. For example, by means of a universal proposition (4) it reduces the goal to prove $Q(x_1, x_2, \ldots x_n)$ to the subgoal to prove a proposition $P(x_1, x_2, \ldots x_n)$ with free variables $x_1, x_2, \ldots x_n$, that is, to construct $x_1, x_2, \ldots x_n$ such that $P(x_1, x_2, \ldots x_n)$ holds.

The contradiction procedure applies the method of reductio ad absurdum to prove the negation of a proposition. First, it applies universal propositions in preceding proof steps, in definitions, and in lemmas to the partial proof. It introduces the assumption that the proposition holds whose negation is to be proved. If the antecedent of a universal proposition in a preceding proof step contains a subset of a set, it calls the set procedure which constructs subsets of such sets. Then, for each subset it calls the forward procedure and the case procedure within a time limit, for example, a minute. The time limit is doubled if the two procedures fail for all examples. It is permanently tested whether a contradiction arises in the application of the forward procedure and the case procedure. Such a contradiction finally implies the negation to be proved.

The forward procedure repeatedly applies universal propositions in preceding proof steps, in definitions, and in lemmas to the partial proof. For example, the application of the universal proposition $$\forall x_1, x_2, \ldots, x_n (P(x_1, x_2, \ldots, x_n) \to Q(x_1, x_2, \ldots, x_n)) \quad (6)$$

to a proposition $P(\alpha_1, \alpha_2, \ldots, \alpha_n)$ in the partial proof yields the proposition $Q(\alpha_1, \alpha_2, \ldots, \alpha_n)$.

The scope of the universal procedure (6) contains a single implication. The forward procedure transforms universal propositions that have not the form (6) into universal propositions of this form. For example, universal propositions of the form $$\forall x (P(x) \to (Q(x) \Leftrightarrow R(x))) \quad (7)$$

are transformed into universal propositions $\forall x(P(x) \land Q(x) \to R(x))$ and $\forall x(P(x) \land R(x) \to Q(x))$ and then processed like the universal proposition (6), that is, the application of the universal proposition (7) to the propositions $P(\alpha)$ and $Q(\alpha)$ in preceding proof steps yields the proposition $R(\alpha)$ and the application of the universal proposition (7) to the propositions $P(\alpha)$ and $R(\alpha)$ in preceding proof steps yields the proposition $Q(\alpha)$.

If a universal propositions contains an equivalence $A \Leftrightarrow B$, the forward procedure generates a new universal proposition by replacing the equivalence $A \Leftrightarrow B$ by the equivalence $\neg A \Leftrightarrow \neg B$. Then, the new universal proposition is transformed into simpler universal propositions of the form (6). For example, thus the universal proposition $$\forall x (P(x) \to (\neg Q(x) \Leftrightarrow \neg R(x))), \quad (8)$$

arises from the universal proposition (7). The proposition (8) is transformed into the simpler universal propositions $\forall x(P(x) \land \neg Q(x) \to \neg R(x))$ and $\forall x(P(x) \land \neg R(x) \to \neg Q(x))$. These simpler propositions are applied in the same way as the universal proposition (6).

Analogously to propositions with one variable which contain several implications, the forward procedure also processes universal propositions containing several variables and several propositions. Such universal propositions are transformed into simpler universal propositions of the form (6) which only contain one implication and then applied in the same way as these simpler universal propositions. For example, the forward procedure transforms universal propositions of the form $$\forall x (P(x) \to \forall y (Q(x, y) \Leftrightarrow R(x, y))) \quad (9)$$

into universal propositions $\forall x, y(P(x) \land Q(x, y) \to R(x, y))$ and $\forall x, y(P(x) \land R(x, y) \to Q(x, y))$ and processes them in then same way as the universal proposition (6). Several variables $x_1, x_2, \ldots, x_n$ and $y_1, y_2, \ldots, y_n$ may occur instead of the variables x and y in (9).

If the antecedent $P(x_1, x_2, \ldots, x_n)$ of a universal proposition (6) is an existential procedure, the forward procedure attempts to apply the rule of existence introduction to a proposition in the partial proof in order to generate an existential proposition. For example, if the antecedent $P(x_1, x_2, \ldots, x_n)$ in the universal proposition (6) has the form $\exists y R(x_1, x_2, \ldots, x_n, y)$, the application of the rule of existence introduction to a proposition $R(\alpha_1, \alpha_2, \ldots, \alpha_n, b)$ in a preceding proof step yields the existential proposition $\exists y R(\alpha_1, \alpha_2, \ldots, \alpha_n, y)$, that is, $P(\alpha_1, \alpha_2, \ldots, \alpha_n)$. The application of the universal proposition (6) to this existential proposition then yields the proposition $Q(\alpha_1, \alpha_2, \ldots, \alpha_n)$.

The case procedure calls the composition procedure which produces propositions by means of rules. If negations of propositions are produced, these negations are deleted. For every proposition the case procedure introduces the assumption that this proposition holds and calls the forward procedure within a time limit, for example, one minute. If the forward procedure fails for all propositions, the time limit is doubled. It is permanently tested whether a contradiction arises in the application of the forward procedure. Such a contradiction implies that the negation of the proposition introduced by the case procedure holds. Then, the forward procedure is called again.

The inequality procedure proves inequalities by calling the reduction, transitivity, triangle, and replacement procedure within time limits. The reduction procedure, which is also called by the proof and the negation procedure, has already been described above.

The transitivity procedure applies the transitivity of the inequality relation which says that the relations $x<y$ and $y<z$ imply the relation $x<z$ for all real numbers x, y, and z. If $x<z$ is an inequality to be proved, the transitivity procedure searches in preceding proof steps for an inequality of the form $x<y$, where y denotes a term, and calls the proof procedure to prove the inequality $y \leq z$. The application of the transitivity of the inequality relation to $x<y$ and $y \leq z$ then yields the inequality $x<z$ to be proved.

The triangle procedure applies the triangle inequality to prove an inequality. The triangle inequality says that $|x-z| \leq |x-y| + |y-z|$ holds for all real numbers x, y, and z. If $|x-z| \leq \alpha$ is an inequality to be proved, the triangle procedure calls the proof procedure to prove a proposition of the form $y \in R$ with a free variable y, that is, to construct a real number y. Then, it calls the proof procedure to prove the inequalities $|z-y| \leq \alpha/2$ and $|y-z| \leq \alpha/2$. The application of the triangle inequality then yields the inequality $|x-z| \leq \alpha$ to be proved.

The replacement procedure changes the representation of a proposition to be proved and calls the proof procedure to prove the changed proposition. It searches for terms s in a proposition P(s) to be proved and calls the equation procedure described above to prove an equation of the form s=t, where t is a term to be constructed. Then, it replaces the term s in the proposition P(s) by t and calls the proof procedure to prove the resulting proposition P(t). Because of s=t, the proposition P(t) implies the proposition P(s) to be proved.

The simplification procedure simplifies propositions in proof steps and propositions in subgoals to be proved. It is called if a new proof step or a new subgoal is generated. Examples of simplifications are:

If a proposition contains the term $|0|$, that is, the absolute value of 0, this term is replaced by 0.

If a proposition contains the term x−x, this term is replaced by 0.

If a proposition has the form $\alpha \in \{x : P(x)\}$, this proposition is replaced by $P(\alpha)$.

If a proposition contains a union $\cup_{A \in f(S)} A$ of sets A, this union is replaced by a union $\cup_{x \in S} f(x)$ of sets $f(x)$.

If a proposition in a proof step or a subgoal can be simplified, the procedure generates a new proof step or a new subgoal which contains the simplified proposition.

The selection procedure selects lemmas and definitions which are useful for a theorem proving problem from a knowledge base. To this end, it processes a list of names of mathematical concepts which is empty at the beginning. If a new proof step or a new subgoal is generated, the selection procedure tests whether the proof step or the subgoal contain names of concepts which are not contained in the list and adds these names to the list. If definitions of concepts occurring in the list contain names that do not occur in the list, these names are also added to the list. The other procedures, for example, the forward and the reduction procedure, only use definitions and lemmas that contain only concepts occurring in the list.

If a procedure, for example, the skolem, the set, the forward, the equation, or the contradiction procedure, generates an existential proposition $\exists x_1, x_2, \ldots, x_n P(x_1, x_2, \ldots, x_n)$, it applies the rule of inference of existence elimination. This yields a proposition $P(x_1, x_2, \ldots, x_n)$.

The computer system also contains variations of the procedures described above which result from these procedure or the examples described subsequently in an obvious way.

First, the automatic proof of a simple theorem in mathematical logic by an adaptive computer system is described. In the proof of this theorem a famous procedure in mathematical logic, that is, Cantor's diagonal method, is rediscovered by an adaptive computer system (see Kleene, S. C., *Introduction to Metamathematics*. Amsterdam: North-Holland, 1952, p. 6). This publication is repeatedly referred to subsequently. The theorem requires the following definition:

Definition 3 Two sets A and B are equal, that is, A=B, if they contain the same elements. A formalization of this definition is: $\forall A, B(A=B \Leftrightarrow \forall x(x \in A \Leftrightarrow x \in B))$ The theorem is:

Theorem 4 The set of sets of natural numbers is nor enumerable, that is, there is no function $f$ on the set N of natural numbers into the set of natural numbers such that for all sets S of natural numbers there is a natural number $n \in N$ with $S=f(n)$. A formalization of this theorem is:

$$\neg \exists f(\text{function}(f, N) \wedge \forall n(n \in N \rightarrow f(n) \subseteq N) \wedge \forall S(S \subseteq N \rightarrow \exists n(n \in N \wedge S=f(n))))$$

First, the proof of Theorem 4 is given in ordinary representation. Then, it is described how the proof is generated by the computer system.

The proof of Theorem 4 in ordinary representation is: We assume that the set of sets of natural numbers is enumerable and derive a contradiction. Then, the theorem follows from this contradiction. The assumption implies that there there is a function $f$ on the set N of natural numbers into the set of sets of natural numbers such that for all sets S of natural numbers there is a natural number $n \in N$ with $S=f(n)$, that is, the sets S and $f(n)$ contain the same elements. According to Cantor's diagonal method we define a set S of natural numbers as follows: A natural number $n \in N$ is contained in S if and only if n is not contained in the set $f(n)$. Because of our assumption there is a natural number $n \in N$ for the set S such that $S=f(n)$ holds. We assume that n is an element of S. Then, according to the definition of the set S, n is not contained in the set $f(n)$. Because of $S=f(n)$ this yields a contradiction. Thus, our assumption is false, that is, n is not contained in S. Because of $S=f(n)$ it follows that n is not contained in $f(n)$. But according the definition of the set S this results that n is contained in S. This yields a contradiction because we have already proved that n is not contained in S. Thus, we have derived a contradiction from the original assumption that the set of sets of natural that is, that there is a function $f$ on the set N of natural numbers into the set of sets of natural numbers such that for all sets S of natural numbers there is a natural number n∈N

TABLE 1

A proof that the set of sets of natural numbers is not enumerable

| | |
|---|---|
| 1. assume ∃ f(function(f, N) ∧ ∀n(n ∈ N → f(n) ⊆ N) ∧ ∀S(S ⊆ N → ∃n(n ∈ N ∧ S = f(n))) | Contradiction procedure |
| 2 function(f,N) ∧ ∀n(n ∈ N → f(n) ⊆ N) ∧ ∀S(S ⊆ N → ∃n(n ∈ N ∧ S = f(n))) | Contradiction procedure: 1 |
| 3. S ⊆ N ∧ ∀n(n ∈ N → (n ∈ S ↔ ¬n ∈ f(n))) | Composition procedure |
| 4. ∃n(n ∈ N ∧ S = f(n)) | Set procedure: 2, 3 |
| 5. n ∈ N ∧ S = f(n) | Set procedure: 4 |
| 6. assume n ∈ S | Case procedure |
| 7. ¬n ∈ f(n) | Forward procedure: 3, 5, 6 |
| 8. n ∈ f(n) | Forward procedure: D. 3; 5, 6 |
| 9. ¬n ∈ S | Case procedure: 6, 7, 8 (contradiction) |
| 10. ¬n ∈ f(n) | Forward procedure: D. 3; 5, 9 |
| 11. n ∈ S | Forward procedure: 3, 5, 10 |
| 12. ¬∃f(function(f, N) ∧ ∀n(n ∈ N → f(n) ⊆ N) ∧ ∀S(S ⊆ N → ∃n(n ∈ N ∧ S = f(n))) | Contradiction procedure: 1, 9, 11 | numbers is enumerable. This implies that the set of sets of natural numbers is not enumerable which was to be proved.

Table 1 contains a mechanical proof of Theorem 4 which is generated by the contradiction, set, composition, case, and forward procedure in some six minutes on a simple personal computer. This proof corresponds to the proof of Theorem 4 in ordinary representation which has been described above. The proof in Table 1 consists of twelve proof steps. Each proof step contains a number, a proposition or an assumption, and an explanation which gives the procedures, definitions, lemmas, and preceding proof steps that were used to derive the proposition or generate the assumption. For example, proof step 1 is generated by the contradiction procedure, proof step 4 by applying the set procedure to proof steps 2 and 3 and proof step 8 by applying the forward procedure to Definition 3 and proof steps 5 and 6.

The proof in Table 1 is generated as follows: First, the proof procedure calls the search procedure which fails because the partial proof does not contain a proof step in the beginning and Theorem 4 is not equal to Definition 3. Then, the proof procedure realizes that Theorem 4 is a negation and calls the negation procedure. The negation procedure first calls the reduction procedure which fails because the partial proof does not contain a proof step and Theorem 4 cannot be reduced to a with S=f(n). The application of the rule of existence elimination to the existential proposition in proof step 1 then yields proof step 2.

Because the antecedent S⊆N in the second universal proposition in proof step 2 contains a subset S of a set N, the contradiction procedure calls the set procedure which constructs examples of subsets S⊆N. Because proof steps 1 and 2 do not contain a suitable predicate for the definition of a subset S⊆N, the set procedure calls the composition procedure which constructs predicates defining subsets S⊆N. To this end, the composition procedure introduces a variable n∈N. This yields the second step in Table 2. Then, it applies propositions in the partial proof and Rules 1 and 2. This yields steps 4, 5, and 6 in Table 2. The composition procedure applies the propositions n∈f(n) and ¬n∈f(n) in steps 5 and 6, which contain the variable n, as predicates to define subsets S⊆N. The predicate n∈f(n) yields the subset S⊆N containing the elements n∈N for which n∈f(n) holds. The predicate ¬n∈f(n) yields the subset S⊆N containing the elements n∈N for which ¬n∈f(n) holds. Proof step 3 in Table 1 contains a formalization of this definition of the subset S⊆N. Now, the composition procedure returns the control to the set procedure which applies the second universal proposition in proof step 2 to the sets defined by the composition procedure. For the set in proof step 3 in

TABLE 2

The construction of predicates by the composition procedure

| | |
|---|---|
| 1. assume ∃f(function(f, N) ∧ ∀n(n ∈ N → f(n) ⊆ N) ∧ ∀S(S ⊆ N → ∃n(n ∈ N ∧ S = f(n)))) | Contradiction procedure |
| 2. function(f, N) ∧ ∀n(n ∈ N → f(n) ⊆ N) ∧ ∀S(S ⊆ N → ∃n(n ∈ N ∧ S = f(n))) | Contradiction procedure: 1 |
| 3. assume n ∈ N | Composition procedure |
| 4. f(n) ⊆ N | Composition procedure: 2, 3 |
| 5. proposition(n ∈ f(n)) | Composition procedure: R. 1; 3, 4 |
| 6. proposition(¬n ∈ f(n)) | Composition procedure: R. 3; 5 | simpler theorem proving task by means of Definition 3. Therefore, the negation procedure calls the contradiction procedure which introduces the assumption in proof step 1 that the proposition holds whose negation is to be proved, Table 1, this yields proof step 4. Then, the set procedure applies the rule of existence elimination to the existential proposition in proof step 4. This yields proof step 5.

Now, the set procedure returns the control to the contradiction procedure which calls the forward and the case procedure within a time limit, for example one minute. The time limit is doubled if the two procedures fail for all examples of subsets. Because the forward and the case procedure fail after one minute, that is, no contradiction arises, the time limit is doubled to two minutes. Because the forward procedure again fails after two minutes, the case procedure is called with a time limit of two minutes. First, the case procedure calls the composition procedure which constructs propositions by applying Rules 1 and 2 to proof steps 1–5 in Table 1. The application of Rule 1 to the propositions S⊆N and n∈N in proof steps 3 and 5 in Table 1 yields the proposition n∈S. The case procedure introduces the assumption in proof step 6 in Table 1 that the proposition n∈S holds and calls the forward procedure. The forward procedure generates proof step 7 by applying the universal proposition in proof step 3 to the propositions n∈N and n∈S in proof steps 5 and 6 and proof step 8 by applying Definition 3 to the propositions n∈S and S=$f$(n) in proof steps 5 and 6. Now, the case procedure realizes that the propositions ¬n∈$f$(n) and n∈$f$(n) in proof steps 7 and 8 imply a contradiction. Therefore, it generates the proposition ¬n∈S in proof step 9 which says that the original assumption n∈S in proof step 6 is false, that is, its negation ¬n∈S is true. Then, the case procedure again calls the forward procedure which generates proof step 10 by applying Definition 3 to the propositions S=$f$(n) and ¬n∈S in proof steps 5 and 9 and proof step 11 by applying the universal proposition in proof step 3 to the propositions S=$f$(n) and ¬n∈$f$(n) in proof steps 5 and 10. Now, the contradiction procedure realizes that the propositions ¬n∈S and n∈S in proof steps 9 and 11 imply a contradiction. Therefore, the original assumption in proof step 1 is false and its negation true, that is, there is no function $f$ on the set N of natural numbers into the set of sets of natural numbers such that for all sets S of natural numbers there is a natural number n∈N with S=$f$(n). Thus, the proof is complete.

Because the construction of the set S of natural numbers in proof step 3 in Table 1 ordinarily requires Cantor's famous diagonal method, the adaptive computer system has automatically rediscovered this method in the proof by of Theorem 4.

The second example of an application of an adaptive computer system is an automatic proof of Gödel's Incompleteness Theorem which is regarded as an epochal discovery and the crowning achievement of mathematical logic (see Davis, M., *The Undecidable*, New York: Raven Press, 1965, p. 1). Gödel's Incompleteness Theorem says that every formal number theory contains an undecidable formula, that is, neither the formula nor its negation are provable in the theory. Because in the proof of this theorem by the adaptive computer system Cantor's diagonal method is also rediscovered, this example altogether shows that adaptive computer systems are capable of producing epochal discoveries and outstanding achievements of different generations of mathematicians in a single step.

The proof of Gödel's Theorem requires an object language and an metalanguage. In the object language, the ordinary notation is used, for example, ∀, ∃, and ¬. In the metalanguage "all" stands for ∀, "there-is" for ∃, and "not" for ¬.

The substitution of a term t for a variable x in a formula F(x) yields a formula F(t) (see Kleene, 1952, p. 78). Two representations for the formula F(t) are used in the proof of Gödel's Theorem: the ordinary representation and the expression sub(F, x, t). An example: An example: Let t be a term which is free for the variable x in a formula F(x). The rule of existence introduction implies that ∃xF(x) is provable if F(t) is provable (see Kleene, 1952, p. 78). A formalization is:

$$\text{all } F, x, t(\text{provable}(\text{sub}(F, x, t)) \rightarrow \text{provable}(\exists xF)) \tag{10}$$

Let A(x, y) be a formula such that A(k, n) is provable for some numerals k and n which represent the natural numbers k and n in formal number theory (see Kleene, 1952, p. 195). An immediate application of the rule of existence introduction (10) to the provable formula A(k, n) is impossible because the expression sub(F, x, t) in the antecedent of (10) cannot be matched with the formula A(k, n). Therefore, this formula is translated into the expressions $$\text{sub}(A(x, n), x, k) \tag{11}$$

and $$\text{sub}(A(k, y), y, n). \tag{12}$$

The matching of the expression sub(F, x, t) in (10) with the expression (11) yields the substitution A(x, n)/F, x/x and k/t and thus the instance provable(∃xA(x, n)) of the consequent of (10). Analogously, the expression (12) yields the consequent ∃yA(k, y).

In the formalization of Gödel's Incompleteness Theorem and its proof, num(n) stands for the numeral n of a natural number n, gn(F) stands for the Gödel number of a formula F, and gnp(n, F, T) means that n is the Gödel number of a proof of a formula F in a formal theory T (see Kleene, 1952, p. 206). Gödel's Incompleteness Theorem requires two definitions.

Definition 5 A formal theory is consistent if for no formula F both F and ¬F are provable in the theory (see Kleene, 1952, p. 124). Formalization:

$$\text{all } T(\text{formal-number-theory}(T) \rightarrow (\text{consistent}(T) \Leftrightarrow \text{all } F(\text{provable}(F, T) \rightarrow \text{not}(\text{provable}(\neg F, T)))))$$

Definition 6 A formal theory is ω-consistent if every formula F(x) has the following property: If F(n) is provable for all natural numbers n, then ¬∀xF(x) is not provable, that is, •¬$\overline{\forall xF(x)}$ (see Kleene, 1952, p. 207). Formalization:

$$\text{all } T(\text{formal-number-theory}(T) \rightarrow (\omega\text{-consistent}(T) \Leftrightarrow \text{all } F, x(\text{all } n(\text{natural-number}(n) \rightarrow \text{provable}(\text{sub}(F, x, \text{num}(n)), T)) \rightarrow \text{not}(\text{provable}(\neg\forall xF, T)))))$$

Theorem 7 (Gödel's Incompleteness Theorem) There is a closed formula F of formal number theory such that F is not provable, that is, •F, if the theory is consistent and ¬F is not provable, that is, •F, if the theory is ω-consistent. Formalization:

$$\text{all } T(\text{formal-number-theory}(T) \rightarrow \text{there-is } F(\text{closed-formula}(F, T) \& (\text{consistent}(T) \rightarrow \text{not}(\text{provable}(F, T))) \& (\omega\text{-consistent}(T) \rightarrow \text{not}(\text{provable}(\neg F, T)))))$$

In contrast to the ordinary form of Gödel's Theorem, the form given above does not contain an undecidable formula (see Kleene, 1952, pp. 207–208). Thus, the additional task of the adaptive computer system was to discover such a formula which is the most essential part of the ordinary form of Gödel's Theorem.

The computer system took some 16 hours to generate a proof of Gödel's Incompleteness Theorem on a simple personal computer. First, the proof is given in ordinary representation. Then, it is described how it is generated by the computer system. The proof requires the definition of a predicate A(k, n) and five lemmas.

Definition 8 The predicate A(k, n) is defined as follows: k is the Gödel number of a formula F(x) and n is the Gödel number of a proof of F(k) (see Kleene, 1952, p. 206). Formalization:

all $T, F, n$(formal-number-theory$(T) \rightarrow (A(gn(F), n) \Leftrightarrow gnp(n, \text{sub}(F, x, \text{num}(gn(F))), T))$ Lemma 9 A formal number theory contains a formula A(x, y) which expresses the predicate A(k, n) or the Gödel numbering (see Kleene, 1952, p. 207). This means that •A(k, n), that is, A(k, n) is provable, if A(x, y) is true and that •¬A(k, n), that is, ¬A(k, n) is provable, if A(k, n) is false. Formalization:

all $T, k, n$(formal-number-theory$(T) \rightarrow (A(k, n) \rightarrow \text{provable}(A(\text{num}(k), \text{num}(n)), T))$ & $(\text{not}(A(k, n)) \rightarrow \text{provable}(\neg A(\text{num}(k), \text{num}(n)), T))))$ Lemma 10 A formula is provable if and only if there is a natural number which is the Gödel number of a proof of the formula (see Kleene, 1952, p. 206). Formalization:

all $T, F$(formal-number-theory$(T) \rightarrow (\text{provable}(F, T) \Leftrightarrow \text{there-is } n(gnp(n, F, T))))$ Lemma 11 An ω-consistent formal theory is consistent (see Kleene, 1952, p. 207). Formalization:

all $T$(formal-number-theory$(T)$ & ω-consistent$(T) \rightarrow$ consistent$(T))$ Lemma 12 Let t be a term which is free for the variable x in a formula F(x). The rule of existence introduction implies that ∃xF(x) is provable if F(t) is provable (see Kleene, 1952, p. 99). Formalization:

all $T, F, x, t$(formal-number-theory$(T)$ & provable(sub$(F, x, t)) \rightarrow$ provable$(\exists xF, T))$ Lemma 13 Each of ∃ and ∀ can be expressed in terms of the other and ¬ (see Kleene, 1952, p. 162). Formalization:

all $T, F, x$(formal-number-theory$(T) \rightarrow$ (provable$(\exists xF, T) \Leftrightarrow$ provable($\neg \forall x \neg F, T)))$ The proof in ordinary representation is: Let k be the Gödel number of the formula B(x) defined by ∀y¬A(x,y). We show that the closed formula B(k) is undecidable. We assume that the theory is consistent, and •B(k), that is, B(k) is provable, and derive a contradiction. Because B(k) is provable, there is a natural number n which is the Gödel number of a proof of B(k). Therefore, A(k, n) holds according to Definition 8. Because A(x, y) expresses A(k, n), •A(k, n), that is, A(k, n) is provable. By the rule of existence introduction (Lemma 12), •∃yA(k, y). This implies • ¬∀y¬A(k, y), that is, •¬B(k), because ∃ can be expressed by ∀ and ¬ (Lemma 13). This yields a contradiction because of the consistency of the theory and •B(k). It follows that, if the theory is consistent, •B(k), that is, B(k) is not provable. Now, we assume that the theory is ω-consistent and prove •¬B(k), that is, ¬B(k) is not provable. Because the theory is ω-consistent, it is consistent according to Lemma 11. Therefore, •B(k), that is, B(k) is not provable. Let n be a natural number. Because A(k, n) implies •B(k), that is, B(k) is not provable, and thus a contradiction, A(k, n) is false. Therefore, •¬A(k, n) because A(x, y) expresses A(k, n). Thus, •¬A(k, n) for all natural numbers n. Because of the ω-consistency, •¬∀y¬A(k, y), that is, •¬B(k). It follows that, if the theory is ω-consistent, •¬B(k), that is, ¬B(k) is not provable. This completes the proof of Gödel's Incompleteness Theorem.

Table 3 contains a mechanical proof of Gödel's Incompleteness Theorem which corresponds to the proof in ordinary representation given above. Each proof step contains a number, a proposition or an assumption, and an explanation which gives the procedures, definitions, lemmas, and preceding proof steps that were used to derive the proposition or generate the assumption. For example, proof step 5 is produced by the contradiction procedure by applying Definition 5 to the assumption in step 4. Proof step 7 is produced by the forward procedure by applying Lemma 10 to the assumptions in steps 1 and 6. The second proof step introduces the name k for the Gödel number of the formula ∀y ¬A(x, y). In order to improve the readability of the proof in Table 3, the numerals k and n stand for num(k) and num(n).

Proof steps 9, 11, 21, and 27 use Definitions 6 and 8 and Lemma 12 which contain expressions of the form sub(F, x, t), that is, they require the substitution of term t for a Variable x in a formula F. As described above, formulas in preceding proof steps are also translated into such a representation so that the expressions of the form sub(F, x, t) in definitions and lemmas can be matched with these formulas. For example, the formula A(k, n) in step 10 is translated into the expression sub(A(k, y), y, n). The matching of the expression sub(F, x, t) in the antecedent of Lemma 12 with this expression yields the substitution A(k,y)/F, y/x, and n/t and thus the instance provable(∃yA(k,y), T) of the consequent of Lemma 12 in proof step 11. In proof step 27 the substitution T/T, ¬A(k, y)/F, and y/x for the variables T, F, and x in Definition 6 is applied. In proof steps 9 and 21 the substitution T/T, ∀y¬A(x, y)/F, and n/n for the variables T, F, and n in Definition 8 is applied.

Roughly speaking, the composition procedure constructs several closed formulas and the implication procedure proves that one of these formulas is not provable if the theory is consistent and that its negation is not provable if the theory is ω-consistent. This formula is contained in proof steps 2 and 3. The proof of the first implication in proof step 15 is simply achieved by the contradiction and the forward procedure. The proof of the second implication in proof step 28 requires an interaction of the reduction, universal, contradiction, and forward procedure.

Because the theorem to be proved is a universal proposition, the proof procedure calls the universal procedure. It introduces the assumption in step 1 which says that the antecedent of the theorem holds. Then, it calls the proof procedure to prove the consequent of the theorem which is an existential proposition. Because this existential proposition says that there is closed formula satisfying a certain property, the existential procedure calls the composition procedure which constructs 24 closed formulas on the basis of the following seven rules:

Rule 14 A formal number theory contains a variable x. Formalization:

all $T$(formal-number-theory($T$)→variable($x$, $T$))

Rule 15 A formal number theory contains a variable y. Formalization:

all $T$(formal-number-theory($T$)→variable($y$, $T$))

Rule 16 A formal number theory contains a formula A(x, y) (see Lemma 9). Formalization:

all $T$(formal-number-theory($T$)→formula($A(x, y)$, $T$))

Rule 17 If F is a formula of a formal number theory, then ¬F is also a formula. Formalization:

all $T, F$(formal-number-theory($T$)∧formula($F, T$)→formula($\neg F, T$))

Rule 18 If F is a formula and x a variable, then ∀xF is a formula. Formalization:

all $T, x, F$(formal-number-theory($T$)∧variable($x, T$)∧formula($F, T$)→formula($\forall x F, T$))

Rule 19 The Gödel number of a formula is a natural number. Formalization:

all $T, F$(formal-number-theory($T$)∧formula($F, T$)→natural-number($gn(F)$))

Rule 20 If F is a formula, x a variable, and n a natural number, then sub(F, x, num(n)) is a formula. Formalization:

all $T, F$(formal-number-theory($T$)∧formula($F, T$)∧variable($x, T$)∧natural-number($n$)→formula(sub($F, x, $ num($n$)), $T$)

∀y¬A(x, y) and the function sub in the formula in step 8 in Table 4 is executed, that is, the variable x in the formula ∀y ¬A(x, y) is replaced by the numeral k for the natural number k. The existential procedure first processes four short formulas of the 24 formulas produced by the composition procedure. One of these short formulas is the formula in step 3 in Table 3. The existential procedure successively substitutes one of the four formulas for the variable F in the scope of the existential proposition in Gödel's Theorem and repeatedly calls the proof procedure to prove the resulting instances of the scope within a time limit which is one minute in the beginning and which is doubled if the proof procedure fails for all formulas. This failure repeats many times until the time limit is 128 minutes and the formula in step 3 in Table 3 is processed. In order to prove the first implication in the scope of the existential proposition, the implication procedure generates the assumption in proof step 4 that the antecedent of the implication holds. Then, it calls the proof procedure to prove the consequent $$\text{not(provable}(\forall y \neg A(\text{num}(k), y), T)). \tag{13}$$

Because (13) is a negation, the proof procedure calls the negation procedure. First, the negation procedure calls the reduction procedure within a time limit. Because the reduction procedure fails, negation procedure calls the contradiction procedure. First, it produces proof step 5 by applying Definition 5 to the partial proof. Then, it generates the assumption in proof step 6 that the proposition provable(∀y ¬A(num(k), y), T) holds whose negation (13) is to be proved. Then, it calls the forward procedure which produces proof steps 7–13 by applying definitions, lemmas, and universal procedures in the partial proof to preceding proof steps. Because proof steps 12 and 13 imply a contradiction, the contradiction procedure generates proof step 14 containing the negation (13) of the assumption in proof step 6. Finally, the implication procedure generates the implication in proof step 15 from proof steps 4 and 14. Thus, it is proved that the formula in step 3 is not provable if the theory is consistent.

The proof of the second implication requires an interaction of the reduction, universal, contradiction, and forward

TABLE 4

The construction of the closed formula in proof step 3 in Table 3

| | |
|---|---|
| 1. assume formal-number-theory(T) | Universal procedure |
| 2. variable(x, T) | Composition procedure: R. 14; 1 |
| 3. variable(y, T) | Composition procedure: R. 15; 1 |
| 4. formula(A(x, y), T) | Composition procedure: R. 16; 1 |
| 5. formula(¬A(x, y), T) | Composition procedure: R. 17; 1, 4 |
| 6. formula(∀y¬A(x, y), T) | Composition procedure: R. 18; 1, 3, 5 |
| 7. natural-number(gn(∀y¬A(x, y))) | Composition procedure: R. 19; 1, 6 |
| 8. formula(sub(∀y¬A(x, y), x, gn(∀y¬A(x, y))), T) | Composition procedure: R. 20; 1, 2, 6, 7 |

Table 4: The construction of the closed formula in proof step 3 in Table 3

Table 4 shows the construction of the closed formula in the third proof step in Table 3 on the basis of these rules. Proof steps 2, 3 and 4 result from an application of Rules 14, 15, and 16 to the first proof step in Table 3. Then, the application of Rules 17, 18, 19, and 20 produces the formula in step 8. The formula in the third proof step in Table 3 arises from this formula as follows: In the second proof step in Table 3, the name k is introduced for the Gödel number of the formula procedure. The implication procedure generates proof step 16 which assumes that the antecedent of the implication holds and calls the proof procedure to prove the consequent $$\text{not(provable}(\neg \forall y \neg A(\text{num}(k), y), T)). \tag{14}$$

Because (14) is a negation, the negation procedure calls the reduction procedure within a time limit. It reduces the goal to prove the negation (14) to the subgoal to prove the universal proposition all $n$(natural-number($n$)→provable($\neg A$(num($k$), num($n$)), $T$)) (15)

as follows: It matches the consequent not(provable(¬∀xF, T)) in Definition 6 with the negation (14) which yields the substitution T/T, y/x, and ¬A(num(k),y)/F. The application of this substitution to the antecedent $$\text{all } n(\text{natural-number}(n) \rightarrow \text{provable}(\text{sub}(F, x, \text{num}(n)), T)) \quad (16)$$

in Definition 6 yields the universal proposition (15). In order to prove (15), the universal procedure introduces the assumption in step 17 that the antecedent of (15) holds. By means of the implication $$\text{not}(A(k, n)) \rightarrow \text{provable}(\neg A(\text{num}(k), \text{num}(n)), T) \quad (17)$$

in Lemma 9, the reduction procedure reduces the goal to prove the consequent $$\text{provable}(\neg A(\text{num}(k), \text{num}(n)), T) \quad (18)$$

of the universal proposition (15) to the subgoal to prove the negation not(A(k, n)). The negation procedure calls the reduction procedure within a time limit. Because the reduction procedure fails, the negation procedure calls the contradiction procedure which produces steps 18 and 19 by applying Lemma 11. Then, it generates the assumption in step 20 that the proposition A(k, n) holds and calls the forward procedure which produces steps 21–23 by applying Definition 8 and Lemma 10. Because steps 19 and 23 yield a contradiction, the contradiction procedure generates step 24 containing the negation not(A(k, n)) of the assumption A(k, n) in step 20. Now, the application of the implication (17) in Lemma 9 to this negation yields step 25. Then, the universal procedure produces the proposition (15) in step 26 from steps 17 and 25. The application of Definition 6 to steps 16 and 26 yields the proposition (14) in step 27. The implication procedure generates step 28 from steps 16 and 27. Thus, it is shown that the negation in the formula in step 3 is not provable if the theory is ω-consistent. Now, steps 3, 15, and 28 yield the existential proposition in step 29. Finally, the universal procedure generates Gödel's Theorem in step 30 from steps 1 and 29.

Ordinarily, proofs of Gödel's Theorem use Cantor's diagonal method to construct the undecidable formula ∀y ¬A(k, y), where k is the Gödel number of the formula ∀y ¬A(x,y) (see Kleene, 1952, pp. 6, 205, 207). In the proof in Table 3, the undecidable formula is produced by the composition procedure which applies Rules 14–20. This means that, the computer system has implicitly rediscovered t Cantor's famous diagonal method in the proof of Gödel's Theorem. Thus, this example altogether shows that adaptive computer systems are capable of producing outstanding achievements of different generations of mathematicians and epochal discoveries in a single step.

The third example of an application of an adaptive computer system is an automatic proof of Heine's Theorem. This proof is much more complex than the preceding proofs. Heine's Theorem says that every continuous function on a compact set of real numbers is uniformly continuous (see Apostol, T. M., *Mathematical Analysis*, Reading, Mass.: Addison-Wesley, 1957, p. 75). Bledsoe gives a list of important theorems in higher mathematics which contains Heine's theorem and whose automatic proof is far beyond the limits of the capabilities of conventional theorem provers (Bledsoe, W. W., Non-resolution theorem proving, *Artificial Intelligence*, Vol. 9, 1977, p. 27). This is still true in the year 1992, that is, 15 years after the publication of this list. Heine's Theorem requires four definitions.

Definition 21 A collection C of sets is called an open covering of a set S of real numbers if $S \subseteq \bigcup_{A \in C} A$ and all sets $A \in C$ are open, i.e., for all $\alpha \in A$, there is an r>0 such that, all real numbers x with $|\alpha - x| < r$ are contained in A. Formalization:

$$\forall C, S(\text{collection}(C, R) \land S \subseteq R \rightarrow (\text{open-covering}(C, S) \leftrightarrow S \subseteq \bigcup_{A \in C} A \land \forall A(A \in C \rightarrow \text{open}(A))))$$

Definition 22 A set S of real numbers is called compact if every open covering of S contains a finite subcollection which also covers S. Formalization:

$$\forall S(S \subseteq R \rightarrow (\text{compact}(S) \leftrightarrow \forall C(\text{collection}(C, R) \land \text{open-covering}(C, S) \rightarrow \exists D(D \subseteq C \land \text{finite}(D) \land S \subseteq \bigcup_{A \in D} A))))$$

Definition 23 A function $f$ on a set S of real numbers with function values in the real numbers is called continuous if the following statement holds: For all $\alpha \in S$ and $\epsilon > 0$, there is a $\delta > 0$ such that $|f(\alpha) - f(x)| < \epsilon$ holds for all $x \in S$ with $|\alpha - x| < \delta$. Formalization:

$$\forall S, f(S \subseteq R \land \text{function}(f, S, R) \rightarrow (\text{continuous}(f, S) \leftrightarrow \forall \alpha, \epsilon (\alpha \in S \land \epsilon \in R \land 0 < \epsilon \rightarrow \exists \delta (\delta \in R \land 0 < \delta \land \forall x (x \in S \land |\alpha - x| < \delta \rightarrow |f(\alpha) - f(x)| < \epsilon)))))$$

Definition 24 A function $f$ on a set S of real numbers with function values in the real numbers is called uniformly continuous if the following statement holds: For all $\epsilon > 0$, there is a $\delta > 0$ such that $|f(x) - f(y)| < \epsilon$ holds for all $x \in S$ and $y \in S$ with $|x - y| < \delta$. Formalization:

$$\forall S, f(S \subseteq R) \land \text{function}(f, S, R) \rightarrow (\text{uniformly-continuous}(f, S) \leftrightarrow \forall \epsilon (\epsilon \in R \land 0 < \epsilon \rightarrow \exists \delta (\delta \in R \land 0 < \delta \land \forall x, y (x \in S \land y \in S \land |x - y| < \delta \rightarrow |f(x) - f(y)| < \epsilon)))))$$

Theorem 25 (Heine) Every continuous function on a compact set of real numbers is uniformly continuous. Formalization:

$$\forall S, f(S \subseteq R \land \text{compact}(S) \land \text{function}(f, S, R) \land \text{continuous}(f, S) \rightarrow \text{uniformly-continuous}(f, S))$$

The computer system took some eight hours to produce a proof of Heine's theorem on a simple personal computer. It contains some 120 proof steps. First, the proof is given in ordinary representation. Then, it is described how it is generated by the computer system.

The proof in ordinary representation is: We assume that $f$ is a continuous function on a compact set S of real numbers. The definition of continuous functions (Definition 23) yields that for all $\alpha \in S$ and $\epsilon > 0$, there is a $\delta > 0$ such that $|f(\alpha) - f(x)| < \epsilon$ for all $x \in S$ with $|\alpha - x| < \delta$. This means that there is a function g on S and the positive real numbers such that if $\alpha \in S$, $x \in S$, $\epsilon > 0$, and $|\alpha - x| < g(\alpha, \epsilon)$, then $$|f(\alpha) - f(x)| < \epsilon. \quad (19)$$

Let $\epsilon>0$. We define a function h on S by $$h(a) = \frac{g(a, \epsilon/2)}{2}, \quad (20)$$

where $\alpha \in S$. For all $\alpha \in S$, we furthermore define sets $$N(\alpha)=\{x : |\alpha-x|<h(\alpha)\} \quad (21)$$

of real numbers. Thus, $N(\alpha)$ is the set of all real numbers whose "distance" from $\alpha$ is less than $h(\alpha)$. The sets $N(\alpha)$, where $\alpha \in S$, form an open covering of S because for all $\alpha \in S$, $\alpha$ is contained in $N(\alpha)$ and $N(\alpha)$ is open. Since S is compact, this implies that there is a finite subset T of S such that $$S \subseteq \bigcup_{a \in T} N(a). \quad (22)$$

We define $$\delta = \min_{a \in T} h(a). \quad (23)$$

Now, we assume $x \in S$ and $y \in S$ with $$|x-y|<\delta \quad (24)$$

in order to prove $$|f(x)-f(y)|<\epsilon. \quad (25)$$

Because of (22), there is an element $\alpha \in T$ such that $x \in N(\alpha)$ holds. Because of (21), we obtain $$|\alpha-x|<h(\alpha). \quad (26)$$

Because of (20), this means that $|\alpha-x|<g(\alpha, \epsilon/2)$, which implies $$|f(a) - f(x)| < \frac{\epsilon}{2} \quad (27)$$

according to (19). Because of (23) and (24), we have $$|x-y|<h(\alpha). \quad (28)$$

The application of the triangle inequality to (26) and (28) yields $$|\alpha-y| \leq |\alpha-x|+|x-y|<h(\alpha)+h(\alpha)=g(\alpha, \epsilon/2) \quad (29)$$

because of (20). From (29), we obtain $$|f(a) - f(y)| < \frac{\epsilon}{2}. \quad (30)$$

because of (19). The application of the triangle inequality to (27) and (30) yields $$|f(x)-f(y)| \leq |f(x)-f(\alpha)|+|f(\alpha)-f(y)|<\epsilon. \quad (31)$$

Thus, the proof of (25) is complete. It follows that the function $f$ is uniformly continuous.

Tables 5, 6 and 7 contain the proof of Heine's Theorem generated by the computer system. The proof corresponds to the proof in ordinary representation given above. Proof steps 22, 25, 27, 33, 37, 40, 52 and 58–61 in Tables 5 and 6 require three further definitions and six lemmas.

Definition 26 A set A is a subset of a set B if all elements contained in A are also contained in B. Formalization:

$$\forall A, B(A \subseteq B \Leftrightarrow \forall x(x \in A \rightarrow x \in B))$$

Definition 27 Let $f$ be a function on a set A. An element x is contained in the image $f(A)$ if and only if there is an element $\alpha \in A$ such that $f(\alpha)=x$. Formalization:

$$\forall A, f, x(x \in f(A) \Leftrightarrow \exists \alpha(\alpha \in A \wedge f(\alpha)=x))$$

Definition 28 Let $(A_i)_{i \in I}$ be an indexed family of sets. The $\bigcup_{i \in I} A_i$ is the set of all x such that $x \in A_i$ for some $i \in I$. Formalization:

TABLE 5

| The first part of a mechanical proof of Heine's Theorem | |
|---|---|
| 1. assume $S \subseteq \mathbf{R} \wedge$ compact(S)$\wedge$ function(f, S, $\mathbf{R}$) $\wedge$ continuous(f, S) | Universal procedure |
| 2. assume $\epsilon \in \mathbf{R} \wedge 0 < \epsilon$ | Universal procedure |
| 3. $\forall C$(collection(C, $\mathbf{R}$)$\wedge$ open-covering(C, S) $\rightarrow$ $\exists D(D \subseteq C \wedge$ finite(D) $\wedge S \subseteq \bigcup_{A \in D} A$)) | Concept procedure: D. 22; 1 |
| 4. $\forall a, \epsilon(a \in S \wedge \epsilon \in \mathbf{R} \wedge 0 < \epsilon \rightarrow \exists \delta(\delta \in \mathbf{R} \wedge 0 < \delta \wedge \forall x(x \in S \wedge |a - x| < \delta \rightarrow |f(a) - f(x)| < \epsilon)))$ | Concept procedure: D. 23; 1 |
| 5. $\exists g$(function(g) $\wedge \forall a, \epsilon(a \in S \wedge \epsilon \in \mathbf{R} \wedge 0 < \epsilon \rightarrow g(a, \epsilon) \in \mathbf{R} \wedge 0 < g(a, \epsilon) \wedge \forall x(x \in S \wedge |a - x| < g(a, \epsilon) \rightarrow |f(a) - f(x)| < \epsilon)))$ | Skolem procedure: 4 |
| 6. function(g) $\wedge \forall a, \epsilon(a \in S \wedge \epsilon \in \mathbf{R} \wedge 0 < \epsilon \rightarrow g(a, \epsilon) \in \mathbf{R} \wedge 0 < g(a, \epsilon) \wedge \forall x(x \in S \wedge |a - x| < g(a, \epsilon) \rightarrow |f(a) - f(x)| < \epsilon))$ | Skolem procedure: 5 |
| 7. function(h, S) | Set procedure |
| 8. $\forall a(a \in S \rightarrow h(a) \in \mathbf{R} \wedge 0 < h(a))$ | Set procedure |
| 9. function(N, S)$\wedge$ $\forall a(a \in S \rightarrow N(a) = \{x:x \in \mathbf{R} \wedge |a - x| < h(a)\})$ | Set procedure |
| 10. collection(N(S), $\mathbf{R}$) | Set procedure: 9 |

TABLE 5-continued

The first part of a mechanical proof of Heine's Theorem

| | |
|---|---|
| 11. assume $a \in S$ | Universal procedure |
| 12. $N(a) = \{x : x \in \mathbf{R} \wedge |a - x| < h(a)\}$ | Equation procedure: 9, 11 |
| 13. $a \in \mathbf{R}$ | Element procedure: 1, 11 |
| 14. $0 < h(a)$ | Reduction procedure: 8, 11 |
| 15. $a \in \mathbf{R} \wedge 0 < h(a)$ | Conjunction procedure: 13, 14 |
| 16. $a \in \mathbf{R} \wedge |0| < h(a)$ | Simplification procedure: 15 |
| 17. $a \in \mathbf{R} \wedge |a - a| < h(a)$ | Simplification procedure: 16 |
| 18. $a \in \{x : x \in \mathbf{R} \wedge |a - x| < h(a)\}$ | Simplification procedure: 17 |
| 19. $a \in N(a)$ | Replacement procedure: 18, 12 |
| 20. $a \in S \wedge a \in N(a)$ | Conjunction procedure: 11, 19 |
| 21. $\exists x (x \in S \wedge a \in N(x))$ | Existential procedure: 20 |
| 22. $a \in \cup_{x \in S} N(x)$ | Reduction procedure: D. 28; 21 |
| 23. $a \in \cup_{T \in N(S)} T$ | Simplification procedure: 22 |
| 24. $\forall a (a \in S \to a \in \cup_{T \in N(S)} T)$ | Universal procedure: 11, 23 |
| 25. $S \subseteq \cup_{T \in N(S)} T$ | Reduction procedure: D. 26; 24 |

TABLE 6

The second part of a mechanical proof of Heine's Theorem

| | |
|---|---|
| 26. assume $T \in N(S)$ | Universal procedure |
| 27. $\exists a (a \in S \wedge T = N(a))$ | Equation procedure: D. 27; 26 |
| 28. $a \in S \wedge T = N(a)$ | Equation procedure: 27 |
| 29. $N(a) = \{x : x \in \mathbf{R} \wedge |a - x| < h(a)\}$ | Equation procedure: 9, 28 |
| 30. $a \in \mathbf{R}$ | Element procedure: 1, 28 |
| 31. $h(a) \in \mathbf{R}$ | Reduction procedure: 8, 28 |
| 32. $0 < h(a)$ | Reduction procedure: 8, 28 |
| 33. open($\{x : x \in \mathbf{R} \wedge |a - x| < h(a)\}$) | Reduction procedure: L. 34; 30, 31, 32 |
| 34. open($N(a)$) | Replacement procedure: 33, 29 |
| 35. open($T$) | Replacement procedure: 34, 28 |
| 36. $\forall T (T \in N(S) \to \text{open}(T))$ | Universal procedure: 26, 35 |
| 37. open-covering($N(S), S$) | Reduction procedure: D. 21; 25, 36 |
| 38. $\exists D (D \subseteq N(S) \wedge \text{finite}(D) \wedge \subseteq \cup_{A \in D} A)$ | Set procedure: 3, 10, 37 |
| 39. $D \subseteq N(S) \wedge \text{finite}(D) \wedge S \subseteq \cup_{A \in D} A$ | Set procedure: 38 |
| 40. $\exists T (T \subseteq S \wedge \text{finite}(T) \wedge D = N(T))$ | Equation procedure: L. 33; 39 |
| 41. $T \subseteq S \wedge \text{finite}(T) \wedge D = N(T)$ | Equation procedure: 40 |
| 42. $S \subseteq \cup_{A \in N(T)} A$ | Paraphrase procedure: 39. 41 |
| 43. $S \subseteq \cup_{a \in T} N(a)$ | Simplification procedure: 42 |
| 44. assume $a \in T$ | Equation procedure |
| 45. $a \in S$ | Element procedure: 41. 44 |
| 46. $N(a) = \{x : x \in \mathbf{R} \wedge |a - x| < h(a)\}$ | Equation procedure: 9; 45 |
| 47. $\forall a (a \in T \to N(a) = \{x : x \in \mathbf{R} \wedge |a - x| < h(a)\})$ | Equation procedure: 44, 46 |
| 48. $S \subseteq \cup_{a \in T} \{x : x \in \mathbf{R} \wedge |a - x| < h(a)\}$ | Paraphrase procedure: 43, 47 |
| 49. assume $\delta \in \mathbf{R} \wedge 0 < \delta$ | Existential procedure |
| 50. assume $x \in S \wedge y \in S \wedge |x - y| < \delta$ | Universal procedure |
| 51. $x \in \cup_{a \in T} \{x : x \in \mathbf{R} \wedge |a - x| < h(a)\}$ | Element procedure: 48, 50 |
| 52. $\exists a (a \in T \wedge x \in \{x : x \in \mathbf{R} \wedge |a - x| < h(a)\})$ | Reduction procedure: D. 28; 51 |
| 53. $x \in \mathbf{R} \wedge \exists a (a \in T \wedge |a - x| < h(a))$ | Simplification procedure: 52 |
| 54. $a \in T \wedge |a - x| < h(a)$ | Reduction procedure: 53 |
| 55. $a \in S$ | Element procedure: 41, 54 |
| 56. $f(s) \in \mathbf{R}$ | Element procedure: 1, 55 |
| 57. $f(x) \in \mathbf{R}$ | Element procedure: 1, 50 |
| 58. $|f(a) - f(x)| = |f(x) - f(a)|$ | Equation procedure: L. 32; 56, 57 |

TABLE 7

The third part of a mechanical proof of Heine's Theorem

| | |
|---|---|
| 59. $2 \in N$ | Search procedure: L. 29 |
| 60. $\epsilon/2 \in \mathbf{R}$ | Reduction procedure: L. 30; 2, 59 |
| 61. $0 < \epsilon/2$ | Reduction procedure: L. 31; 2, 59 |
| 62. assume $h(a) \leq g(a, \epsilon/2)$ | Existential procedure: h |
| 63. $|a - x| < g(a, \epsilon/2)$ | Transitivity procedure: 54, 62 |
| 64. $|f(a) - f(x)| < \epsilon/2$ | Reduction procedure: 6, 50, 55, 60, 61, 63 |
| 65. $|f(x) - f(a)| < \epsilon/2$ | Replacement procedure: 64, 58 |
| 66. assume $h(a) \leq \dfrac{g(a, \epsilon/2)}{2}$ | Existential procedure: h |
| 67. $|a - x| < \dfrac{g(a, \epsilon/2)}{2}$ | Transitivity procedure: 54, 66 |

TABLE 7-continued

The third part of a mechanical proof of Heine's Theorem

| | | |
|---|---|---|
| 68. | assume $\delta \leq \frac{g(a, \epsilon/2)}{2}$ | Existential procedure: $\delta$ |
| 69. | $\|x - y\| < \frac{g(a, \epsilon/2)}{2}$ | Transitivity procedure: 50, 68 |
| 70. | $a \in \mathbf{R}$ | Element procedure: 1, 20 |
| 71. | $y \in \mathbf{R}$ | Element procedure: 1, 50 |
| 72. | $\|a - y\| \leq \|a - x\| + \|x - y\|$ | Triangle procedure: 70, 71, 53 |
| 73. | $\|a - x\| + \|x - y\| < g(a, \epsilon/2)$ | Triangle procedure: 68, 69 |
| 74. | $\|a - y\| < g(a, \epsilon/2)$ | Triangle procedure: 72, 73 |
| 75. | $\|f(a) - f(y)\| < \epsilon/2$ | Reduction procedure: 6, 50, 55, 60, 61, 74 |
| 76. | $f(y) \in \mathbf{R}$ | Element procedure: 1, 50 |
| 77. | $\|f(x) - f(y)\| \leq \|f(x) - f(a)\| + \|f(a) - f(y)\|$ | Triangle procedure: 57, 76, 56 |
| 78. | $\|f(x) - f(a)\| + \|f(a) - f(y)\| < \epsilon$ | Triangle procedure: 65, 75 |
| 79. | $\|f(x) - f(y)\| < \epsilon$ | Triangle procedure: 77, 78 |
| 80. | $\forall x,y (x \in S \wedge y \in S \wedge \|x - y\| < \delta \rightarrow \|f(x) - f(y)\| < \epsilon)$ | Universal procedure: 50, 79 |
| 81. | $\delta \in \mathbf{R} \wedge 0 < \delta \wedge \forall x,y (x \in S \wedge y \in S \wedge \|x - y\| < \delta \rightarrow \|f(x) - f(y)\| < \epsilon)$ | Conjunction procedure: 49, 80 |
| 82. | $\exists \delta (\delta \in \mathbf{R} \wedge 0 < \delta \wedge \forall x,y (x \in S \wedge y \in S \wedge \|x - y\| < \delta \rightarrow \|f(x) - f(y)\| < \epsilon))$ | Existential procedure: 81 |
| 83. | $\forall \epsilon (\epsilon \in \mathbf{R} \wedge 0 < \epsilon \rightarrow \exists \delta (\delta \in \mathbf{R} \wedge 0 < \delta \wedge \forall x,y (x \in S \wedge y \in S \wedge \|x - y\| < \delta \rightarrow \|f(x) - f(y)\| < \epsilon)))$ | Universal procedure: 2, 82 |
| 84. | uniformly-continuous (f,S) | Reduction procedure: D. 24; 83 |
| 85. | $\forall S, f(S \subseteq \mathbf{R} \wedge \text{compact}(S) \wedge \text{function}(f, S, \mathbf{R}) \wedge \text{continuous}(f, S) \rightarrow \text{uniformly-continuous}(f, S))$ | Universal procedure: 1, 84 |

$$\forall x, A_i, I(x \in \cup_{i \in I} A_i \leftrightarrow \exists i (i \in I \wedge x \in A_i))$$

Lemma 29 Two is a natural number. Formalization: $2 \in \mathbf{N}$.

Lemma 30 A fraction of a real number is a real number. Formalization:

$$\forall x, n(x \in R \wedge n \in N \rightarrow x/n \in R)$$

Lemma 31 A fraction of a positive real number is positive. Formalization:

$$\forall x, n(x \in R \wedge 0 < x \wedge n \in N \rightarrow 0 < x/n)$$

Lemma 32 The absolute value of the difference of two real numbers x and y is equal to the absolute value of the difference of y and x. Formalization:

$$\forall x, y (x \in R \wedge y \in R \rightarrow |x-y|=|y-x|)$$

Lemma 33 A finite subset of the image of a function is the image of a finite subset of its domain. Formalization:

$$\forall f, A, S(A \subseteq f(S) \wedge \text{finite}(A) \rightarrow \exists T(T \subseteq S \wedge \text{finite}(T) \wedge A=f(T)))$$

Lemma 34 The set of all real numbers whose distance from a given number is less than a given positive number is open. Formalization:

$$\forall \alpha, p(\alpha \in R \wedge p \in R \wedge 0 < p \rightarrow \text{open}(\{x : x \in R \wedge |x-\alpha| < p\}))$$

The proof in Tables 5, 6, and 7 is generated by the computer system as follows: Because Heine's Theorem is a universal proposition, the universal procedure introduces the assumption in step 1 in Table 5 that its antecedent holds, that is, that $f$ is a continuous function on a compact set S, and generates the subgoal to prove that $f$ is uniformly continuous. By means of the definition of uniformly continuous functions, the reduction procedure reduces this subgoal to the subgoal to prove that $$\exists \delta(\delta \in R \wedge 0 < \delta \wedge \forall x, y(x \in S \wedge y \in S \wedge |x-y|<\delta \rightarrow |f(x)-f(y)|<\epsilon)) \quad (32)$$

holds for all $\epsilon \in R$ with $\epsilon > 0$ (see Definition 24). In order to prove this universal proposition, the universal procedure introduces the assumption in step 2 that $\epsilon > 0$ holds for a real number $\epsilon \in R$ and calls the proof procedure to prove the existential proposition (32). The proof procedure calls the existential procedure which cannot find a suitable $\delta$ in a preceding proof step. Therefore, the existential procedure calls the concept procedure which finds the concepts continuous and compact in step 1 and applies their definitions (Definitions 22 and 23). This yields steps 3 and 4. Because the consequent $\exists \delta(\delta \in R \wedge \ldots)$ in step 4 is an existential proposition, the existential procedure calls the Skolem procedure which replaces the existential quantifier $\exists \delta$ in step 4 by a function g. This produces steps 5 and 6. Then, the concept procedure calls the set procedure because the antecedent in the universal proposition in step 3 contains a collection of sets. In order to construct examples of such collections, the set procedure searches for predicates in preceding proof steps and for example finds the predicate $|\alpha-x|<\delta$ in step 4. It uses the variable $\alpha \in S$ in this predicate as an index of a collection of sets $$N(\alpha)=\{x : x \in R \wedge |\alpha-x|<\delta\}. \quad (33)$$

Because the variable $\delta$ in (33) is free, it is replaced by a function h($\alpha$) on S such that h($\alpha$)$\in$R and h($\alpha$)>0 hold for all α∈S. This yields steps 7–10 in Table 5. Then, the set procedure calls the proof procedure to prove that the collection N(S) of sets of real numbers forms an open covering of S.

By means of the definition of open coverings (Definition 21), the reduction procedure reduces the goal to prove the proposition in step 37 in Table 6 that the collection N(S) forms an open covering of S to the subgoal to prove the propositions $$S \subseteq \bigcup_{T \in N(S)} T \tag{34}$$

In step 25 and $$\forall T(T \in N(S) \rightarrow \text{open}(T)) \tag{35}$$

in step 36. By means of the definition of the subset relation (Definition 26), the reduction procedure reduces the goal to prove (34) to the subgoal to prove the proposition $$\forall a \left( a \in S \rightarrow a \in \bigcup_{T \in N(S)} T \right) \tag{36}$$

in step 24. To this end, the universal procedure introduces the antecedent α∈N in (36) as an assumption in step 11 and generates the subgoal to prove the inequality $$a \in \bigcup_{T \in N(S)} T \tag{37}$$

in step 23. The simplification procedure reduces the goal to prove (37) to the subgoal to prove the proposition $$a \in \bigcup_{x \in S} N(x) \tag{38}$$

in step 22. By means of the definition of the union of indexed collections of sets (Definition 28), the reduction procedure reduces the goal to prove (38) to the subgoal to prove the conjunction $$\alpha \in S \wedge \alpha \in N(\alpha) \tag{39}$$

in step 20. The conjunction procedure reduces the goal to prove (39) to the subgoal to prove the propositions α∈S and $$\alpha \in N(\alpha). \tag{40}$$

In order to prove the proposition α∈S, the proof procedure calls the search procedure which finds this proposition in step 11. The search and the reduction procedure fail to prove proposition (40). Therefore, the replacement procedure calls the equation procedure to prove an equation, for example, N(α)=t with a free variable t, that is, to construct a set t that is equal to the set N(α). The equation procedure proves the equation $$N(\alpha) = \{x : x \in R \wedge |\alpha - x| < h(\alpha)\} \tag{41}$$

in step 12 by means of the universal procedure in step 9 and the proposition α∈S in step 11. By means of the equation (41), the replacement procedure reduces the goal to prove (40) to the subgoal to prove the proposition $$\alpha \in \{x : x \in R \wedge |\alpha - x| < h(\alpha)\} \tag{42}$$

in step 18. In three steps, the simplification procedure reduces the goal to prove (42) to the subgoal to prove the proposition $$\alpha \in R \wedge 0 < h(\alpha) \tag{43}$$

in step 15 (see steps 15–18 in Table 5). The first proposition α∈R in (43) is proved by the element procedure in step 13 and the second proposition 0<h(α) in (43) by the reduction procedure in step 14. Thus, the proof of the proposition (34) in step 25 is complete.

In order to prove the universal proposition (35) in step 36, the universal procedure introduces the assumption T∈N(S) in step 26 and calls the proof procedure to prove the consequent $$\text{open}(T) \tag{44}$$

in step 35. Because the reduction procedure fails to prove (44), the replacement procedure calls the equation procedure to prove, for example, an equation of the form T=U with a free variable U, that is, to construct a set U that is equal to the set T. This yields the steps 27 and 28. By means of the equation T=N(S), the replacement procedure reduces the goal to prove (44) to the subgoal to prove the proposition $$\text{open}(N(\alpha)) \tag{45}$$

in step 34. Because the reduction procedure fails to prove (45), the replacement procedure calls the equation procedure which generates the equation in step 29. By means of this equation, the replacement procedure reduces the goal to prove (45) to the subgoal to prove the proposition $$\text{open}(\{x : x \in R \wedge |\alpha - x| < h(\alpha)\}) \tag{46}$$

in step 33. By means of Lemma 34, the reduction procedure reduces the goal to prove (46) to the subgoals to prove the propositions α∈R, h(α)∈R, and 0<h(α). These subgoals are achieved by the element and the reduction procedure in steps 30, 31, and 32. Thus, the proof of the proposition (35) in step 36 is complete. By means of the definition of open coverings (Definition 21), the reduction procedure generates the proposition in step 37 that the family N(S) of sets of real numbers forms an open covering of the set S.

Now, the set procedure generates step 38 by applying the universal proposition in step 3 to steps 10 and 37. Step 39 results from step 38 according to the rule of existence elimination. Then, the set procedure calls the paraphrase procedure which transforms the proposition $S \subseteq \bigcup_{A \in D} A$ in step 39 into a more explicit form. It searches for terms in this proposition, for example, finds D, and calls the equation procedure to prove equations whose left side is equal to such a term and whose right side is to be constructed. In this way, the equation procedure generates step 40 which contains the equation D=N(T). Step 41 results from step 40 according to the rule of existence elimination. The replacement procedure applies the equation D=N(T) in step 41 in order to generate the subset relation $S \subseteq \bigcup_{A \in N(T)} A$ in step 42 from the the subset relation $S \subseteq \bigcup_{A \in D} A$ in step 39. The simplification procedure produces the subset relation $$S \subseteq \bigcup_{a \in T} N(a) \tag{47}$$

in step 43. The replacement procedure again calls the equation procedure to prove an equation whose left side is a subterm of (47) and whose right side is to be constructed. In order to prove an equation $N(\alpha)=U$ with a free variable U, the equation procedure introduces the assumption $\alpha \in T$ in step 44 because the term $N(\alpha)$ in (47) contains the index $\alpha \in T$. By means of the universal proposition in step 9, the equation procedure reduces the goal to prove an equation whose left side is $N(\alpha)$ to the subgoal to prove $\alpha \in S$. This is achieved in step 45 by the element procedure. Now, the equation procedure generates the equation in step 46 by applying the universal proposition in step 9 to step 45. Steps 44 and 47 yield the universal proposition $$\forall \alpha (\alpha \in T \rightarrow N(\alpha) = \{x : x \in R \wedge |\alpha - x| < h(\alpha)\}) \tag{48}$$

in step 47 whose consequent is an equation. By means of this universal proposition (48), the paraphrase procedure generates the subset relation in step 48 from the subset relation (47) in step 43.

The existential procedure introduces a $\delta \in R$ with $\delta > 0$ in step 49 in Table 6 and generates the subgoal to prove the proposition $$\forall x, y (x \in S \wedge y \in S \wedge |x-y| < \delta \rightarrow |f(x) - f(y)| < \epsilon) \tag{49}$$

in (32) in order to find properties of the function h in steps 7 and 8 and the number $\delta$ in step 49. In order to prove the universal proposition (49), the universal procedure introduces two real numbers $x \in S$ and $y \in S$ with $|x-y| < \delta$ in step 50 and generates the subgoal to prove the consequent $$|f(x) - f(y)| < \epsilon \tag{50}$$

in (49). The inequality procedure attempts to prove (50) by means of the reduction, transitivity, and replacement procedure. Because these procedures fail, it calls the triangle procedure which generates

TABLE 8

The construction of the number $f(a) \in \mathbf{R}$ for the triangle procedure

| | | |
|---|---|---|
| 1. Traingle procedure<br>Result: f(a) ∈ R in step 56 | prove x:x ∈ R | (51) |
| 2. Element procedure with function(f, S, R) in step 1<br>Result: a ∈ S in step 55 | prove a:a ∈ S | (52) |
| 3. Element procedure with T ⊆ S in step 41<br>Result: a ∈ T in steps 52–54 | prove a:a ∈ T | (53) |
| 4. Reduction procedure with Definition 28<br>Result: x ∈ $\bigcup_{a \in T}$ {x:x ∈ R∧ \|a − x\| < h(a)} in step 51 | prove x, $A_i$ : x∈ $\bigcup_{i \in T} A_i$ | (54) |
| 5. Element procedure with S ⊆ $\bigcup_{a \in T}$ {x:x ∈ R ∧ \|a − x\| < h(a)} in step 48<br>Result: x ∈ S in step 50 | prove x:x ∈ S | (55) | the subgoal (51) in Table 8 to prove the proposition $x \in R$ with a free variable x, that is, to construct a real number $x \in R$. Table 8 describes how this subgoal is achieved in five stages. Each stage contains a procedure, a subgoal that is generated by this procedure, and the result produced by the subsequent stages. For example, the triangle procedure in the first stage generates the subgoal (51) and the second stage provides the result $f(\alpha) \in R$ in step 56. By means of the assumption function(f, S, R) in step 1 in Table 5 that f is a function on S into R, the element procedure in the second stage reduces subgoal (51) to the subgoal (52) to prove a proposition $\alpha \in S$ with a free variable x, that is, to construct an element $\alpha \in S$. Another application of the element procedure in the third stage reduces subgoal (52) to the subgoal (53) to construct an element $\alpha \in T$. Now, the reduction procedure matches the proposition $\alpha \in T$ in (53) with the proposition $i \in I$ in Definition 28 and uses the resulting substitution $\alpha/i$ and $T/I$ to reduce (53) to the subgoal (54) to construct an x and a family $A_i$ of sets such that $x \in \bigcup_{i \in T} A_i$. Finally, the element procedure reduces subgoal (54) to the subgoal (55) to construct an $x \in S$ which is contained in step 50 in Table 6. From $x \in S$, the element procedure and the reduction procedure produce the real number $f(\alpha) \in R$ and thus satisfy subgoal (51) which was generated by the triangle procedure.

In order to prove the inequality (50) in step 79 in Table 7, the triangle procedure uses the real number $f(\alpha) \in R$ to generate the subgoals to prove the inequalities $$|f(x) - f(a)| < \frac{\epsilon}{2} \tag{56}$$

$$|f(a) - f(y)| < \frac{\epsilon}{2} \tag{57}$$

in steps 65 and 75. Because the reduction and the transitivity procedure fail to prove (56) in step 65, the triangle procedure calls the replacement procedure which for example generates the subgoal $$\text{prove } t : |f(x) - f(\alpha)| = t \tag{58}$$

to prove a proposition $|f(x) - f(\alpha)| = t$ with a free variable t, that is, to construct a term t that is equal to the term $|f(x) - f(\alpha)|$ in (56). The equation procedure matches the term $|x-y|$ in Lemma 32 with the term $|f(x) - f(\alpha)|$ in (58) and uses the resulting substitution $f(x)/x$ and $f(\alpha)/y$ to reduce subgoal (58) to the subgoal to prove $f(\alpha) \in R$ and $f(x) \in R$ according to the antecedent in Lemma 32. The proposition $f(\alpha) \in R$ is contained in step 56 and the proposition $f(x) \in R$ in step 57 is proved by the element procedure. Thus, the equation procedure generates the equation $$|f(x) - f(\alpha)| = |f(\alpha) - f(x)| \tag{59}$$

in step 58 which satisfies subgoal (58). Now, the control is returned to the replacement procedure which applies (59) to reduce the subgoal to prove (56) to the subgoal to prove the inequality $$|f(a) - f(x)| < \frac{\epsilon}{2} \tag{60}$$

in step 64. The reduction procedure matches the inequality (60) with the inequality $|f(\alpha) - f(x)| < \epsilon$ in step 6 and uses the resulting substitution to reduce the goal to prove (60) to the subgoals to prove the propositions $\epsilon/2 \in R$, $0 < \epsilon/2$, and $$|\alpha - x| < g(a, \epsilon/2) \tag{61}$$

in steps 60, 61, and 63. The reduction procedure proves the propositions $\epsilon/2 \in R$ and $0<\epsilon/2$ in steps 60 and 61 by means of Lemmas 30 and 31. Step 59 uses Lemma 29. Because the reduction procedure fails to prove (61), the inequality procedure calls the transitivity procedure which uses the inequality $|\alpha-x|<h(\alpha)$ in step 54 to transform the goal to prove (61) into the subgoal to prove $$h(\alpha) \leq g(\alpha, \epsilon/2) \tag{62}$$

in step 62. Because (62) contains the function h, the existential procedure regards (62) as a property of h and therefore generates the assumption in step 62. Now, the transitivity, reduction, and replacement procedure are applied to step 62 which produces the inequality (56) in step 65.

The second inequality (57) is proved by the transitivity, element, triangle and the reduction procedure in steps 66–75. This yields another property of h in step 66 and a property of δ in step 68. Then, the triangle procedure uses the inequalities (56) and (60) in steps 65 and 75 to prove the universal proposition (50) in step 79. Finally, the universal procedure produces the universal proposition (49) from steps 50 and 79 and returns the control to the existential procedure. Now, the conjunction procedure generates the conjunction in step 81 from steps 49 and 80 and the existential procedure the existential proposition (32) in step 82.

The proof steps so far generated valid on the assumption that the function h and the real number δ satisfy the properties in steps 62, 66, and 68. Now, the existential procedure calls the proof procedure to derive one of these properties from the remaining ones. Because the property of h in step 62 can be derived from the of h property in step 66, the property in step 62 is abandoned. Then, the existential procedure generates the definition $$\forall a \left( a \in S \rightarrow h(a) = \frac{g(a, \epsilon/2)}{2} \right) \tag{63}$$

of h from the property of h in step 66 and the proposition $\alpha \in S$ in step 55. Furthermore, it generates the definition $$\delta = \min_{a \in T} \frac{g(a, \epsilon/2)}{2} \tag{64}$$

of δ from the property of δ in step 68 and the propositions $\alpha \in T$ and finite(T) in steps 41 and 54. It inserts the definition (63) of h into step 7 in Table 5 and calls the proof procedure to prove the proposition in step 8 that $h(\alpha) \in R$ and $f(\alpha)>0$ hold for all $\alpha \in S$. Then, it inserts the definition (64) of δ into step 49 in Table 6 and calls the proof procedure to prove the propositions $\delta \in R$ and $\delta > 0$ in this step. Finally, it calls the proof procedure to prove the properties of h and δ in steps 62, 66, and 68.

Then, the existential procedure returns the control to the universal procedure which generates the universal proposition in step 83 from steps 2 and 82. Now, the reduction procedure applies the definition of uniformly continuous functions (Definition 24) to step 83. This yields step 84. Finally, the universal procedure generates Heine's Theorem in step 85 from steps 1 and 84.

The control and execution components of the adaptive computer system described above are procedures for proving mathematical theorems. Examples of control components are the proof and the inequality procedure. Examples of execution components are the search and the composition procedure. Some control components contain an execution component. For example, the set procedure contains an execution procedure that searches for predicates in order to construct sets from these predicates. The set procedure is a control component because it controls this execution component and the composition procedure. In the computer system described above, resources are often withdrawn if a time limit is exceeded. Some procedures, for example, the search procedure, terminate after a short space of time. Therefore, a limitation of the resources, for example, by time limits, is not required for such procedures.

In complex fields such as theorem proving it is hardly predictable if the application of a procedure produces a combinatorial explosion. By an adjusting selection of procedures, an adaptive computer system is capable of adapting itself to hardly predictable situations because it withdraws resources from unsuccessful procedures producing an combinatorial explosion and calls other procedures.

In order to solve a problem, the computer system described above often calls simple procedures requiring few resources first. For example, the proof procedure first calls the search procedure and the existential procedure first tests whether an element whose existence is to be proved is already contained in the proof. The computer system generates simple variations of procedures, for example, by calling a procedure within a time limit. The computer system generates simple variations of procedures, for example, by calling a procedure within a time limit and then increasing this time limit. Thus, a simple variation of the procedure originally called arises.

The composition procedure generates the set S in proof step 3 in Table 1 and the undecidable formula in proof step 3 in Table 3. The set S and this undecidable formula are the central ideas of the proof of Theorem 4 in Table 1 and the proof of Gödel's Incompleteness Theorem 7 in Table 3. The adaptive computer system also generates a proof the Bolzano-Weierstrass Theorem which says that every bounded infinite set S of real numbers has an accumulation point (see Apostol, T. M., *Mathematical Analysis*, Reading, Mass.: Addison-Wesley, 1957, p. 43). In this proof the composition procedure produces the predicate P(x) that the set of all $y \in S$ with $y<x$ is finite. The supremum of all sets of real numbers x which satisfy this predicate is an accumulation point of S. The predicate P(x) is the central idea of the proof of the Bolzano-Weierstrass Theorem. Bledsoe gives a list of important theorems in higher mathematics which contains the Bolzano-Weierstrass Theorem and whose automatic proof is far beyond the limits of the capabilities of conventional theorem provers (Bledsoe, W. W., Non-resolution theorem proving, *Artificial Intelligence*, Vol. 9, 1977, p. 27). This is still true in the year 1992, that is, 15 years after the publication of this list. The proofs of the Bolzano-Weierstrass Theorem, Heine's Theorem, and Gödel's Incompleteness Theorem show that even simple adaptive computer systems are capable of proving such theorems automatically.

The selection procedure selects knowledge, that is, definitions and lemmas, that are useful for the proof of a theorem from a knowledge base. For example, in the proof of Heine's theorem this knowledge base also contains many axioms, definitions and lemmas that are required for the proof the Bolzano-Weierstrass Theorem or are taken from Apostol's textbook on analysis (see Apostol, T. M., *Mathematical Analysis*, Reading, Mass.: Addison-Wesley, 1957, p. 43).

The computer system described above contains control components which in several adjustments having a cyclic structure can be activated by a control component whose activation they themselves have caused. For example, the proof procedure calls the universal, the existential, and the conjunction procedure and these procedures again call the proof procedure. Such a cyclic structure may also contain more than two control procedures. For example, the proof procedure calls the inequality procedure, the inequality procedure the transitivity procedure, and the transitivity procedure again the proof procedure.

INDUSTRIAL APPLICABILITY

Potential fields of application of adaptive computer systems are fields in which conventional systems which are based on fixed components fail or in which the efficieny of conventional systems is limited. Adaptive Computer systems are in particular suitable for complex applications in which new hardly predictable problems and situations must be coped with and thus an automatic adaption of these systems is required. Examples of fields of application are image and language processing and robotics.

What is claimed is:

1. A computer system having a memory for storing programs and knowledge, obtaining input signals and generating output signals wherein said input signals and said output signals represent information, comprising:

a plurality of execution means for obtaining said input signals, solving problems, and generating said output signals, control means for controlling said execution means in adjustments wherein resources are withdrawn from at least one of said execution means that cannot solve a problem and another one of said execution means is activated, and means for selecting and organizing said execution means in further adjustments so that said problems can be solved by said execution means.

2. A computer system as set forth in claim 1, comprising means for adapting said control means and said means for selecting and organizing said execution means to hardly predictable ones of said problems that cannot in advance be described completely and in all details.

3. A computer system as set forth in claim 1, comprising means for generating a variation of at least one of said execution means in an adjustment and means for activating said variation.

4. A computer system as set forth in claim 1, wherein said control means first activates at least one of said execution means that requires few resources.

5. A computer system as set forth in claim 1, wherein at least one of said execution means comprises means for generating methods for solving at least one of said problems by composing elementary concepts.

6. A computer system as set forth in claim 1, wherein said control means reduces at least one of said problems to another one of said problems.

7. A computer system as set forth in claim 1, wherein said control means controls a plurality of further control means in further adjustments.

8. A computer system as set forth in claim 1, wherein at least one of said execution means comprises means for selecting knowledge required for solving at least one of said problems from a knowledge base.

9. A computer system as set forth in claim 1, wherein said control means assigns more resources in further adjustments to at least one of said execution means that produces intermediate results.

10. A computer system as set forth in claim 1, wherein said control means is activated in a plurality of further adjustments having a cyclic structure by another control means whose activation said first control means has caused.

11. A process of operating a computer, obtaining input signals and generating output signals wherein said input signals and said output signals represent information, said computer having a memory for storing programs and knowledge comprising a plurality of execution means for obtaining said input signals, solving problems, and generating said output signals, said process comprising the steps of:

controlling said execution means in adjustments wherein resources are withdrawn from at least one of said execution means that cannot solve a problem and another one of said execution means is activated, and selecting and organizing said execution means in further adjustments so that said problems can be solved by said execution means.

12. A process as set forth in claim 11, comprising the step of adapting said step for controlling said execution means and said step for selecting and organizing said execution means to hardly predictable ones of said problems that cannot in advance be described completely and in all details.

13. A process as set forth in claim 11, comprising the step of generating a variation of at least one of said execution means in an adjustment and the step of activating said variation.

14. A process as set forth in claim 11, wherein said step of controlling said execution means first activates at least one of said execution means that requires few resources.

15. A process as set forth in claim 11, wherein at least one of said execution means comprises means for generating methods for solving said problems by composing elementary concepts.

16. A process as set forth in claim 11, wherein said step of controlling said execution means reduces at least one of said problems to another one of said problems.

17. A process as set forth in claim 11, wherein said step of controlling said execution means controls a plurality of further steps of controlling further execution means in further adjustments.

18. A process as set forth in claim 11, wherein at least one of said execution means comprises means for selecting knowledge required for solving at least one of said problems from a knowledge base.

19. A process as set forth in claim 11, wherein said step of controlling said execution means assigns more resources in said adjustments to at least one of said execution means that produces intermediate results.

20. A process as set forth in claim 11, wherein said step of controlling said execution means is activated in a plurality of further adjustments having a cyclic structure by another step of controlling further execution means whose activation said first step has caused.

* * * * *